(12) United States Patent
    Gogia et al.

(10) Patent No.: US 12,681,711 B1
(45) Date of Patent: Jul. 14, 2026

(54) AUTONOMIC CONTROL PLANE SCALING IN A CONTAINER ORCHESTRATION CLUSTER

(71) Applicant: Amazon Technologies, Inc., Seattle, WA (US)

(72) Inventors: Prateek Gogia, Leander, TX (US); Nathan John Herz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 384 days.

(21) Appl. No.: 18/539,056

(22) Filed: Dec. 13, 2023

(51) Int. Cl.
    *G06F 8/61* (2018.01)
    *G06F 9/455* (2018.01)

(52) U.S. Cl.
    CPC ............ *G06F 8/61* (2013.01); *G06F 9/45558* (2013.01)

(58) Field of Classification Search
    None
    See application file for complete search history.

(56) References Cited

U.S. PATENT DOCUMENTS

| | | | | |
|---|---|---|---|---|
| 6,628,617 | B1 * | 9/2003 | Karol | ...................... H04L 12/66 |
| | | | | 370/395.5 |
| 12,101,244 | B1 * | 9/2024 | Tian | ........................ H04L 45/22 |
| 12,499,875 | B2 * | 12/2025 | Ward | ...................... G10L 15/16 |
| 2015/0180769 | A1 * | 6/2015 | Wang | ...................... H04L 45/38 |
| | | | | 370/236 |
| 2016/0165484 | A1 * | 6/2016 | Cui | ................... H04W 28/0284 |
| | | | | 370/235 |
| 2017/0019750 | A1 * | 1/2017 | Palanisamy | ........... H04W 76/36 |
| 2023/0222006 | A1 * | 7/2023 | Zhu | ...................... G06F 9/5077 |
| | | | | 718/104 |
| 2023/0350570 | A1 * | 11/2023 | Bhatnagar | ............... H04L 43/16 |
| 2023/0353495 | A1 * | 11/2023 | Sangle | .................. H04L 47/127 |
| 2024/0037229 | A1 * | 2/2024 | Pabón | ................. G06F 9/45558 |
| 2024/0080277 | A1 * | 3/2024 | Lee | .......................... H04L 67/60 |
| 2024/0146804 | A1 * | 5/2024 | Revanna | ................. G06F 9/544 |
| 2024/0202051 | A1 * | 6/2024 | Rigamonti | .......... H04L 67/1097 |
| 2024/0362128 | A1 * | 10/2024 | Naga | ......................... G06F 8/61 |
| 2024/0364692 | A1 * | 10/2024 | Antinori | ............... H04L 63/102 |
| 2025/0130864 | A1 * | 4/2025 | Biswas | ................. G06F 9/5083 |

* cited by examiner

*Primary Examiner* — Philip Wang
(74) *Attorney, Agent, or Firm* — Nicholson DeVos Webster & Elliott LLP

(57) ABSTRACT

Computer-implemented techniques for autonomic control plane scaling in a container orchestration cluster. The techniques include a method that involves managing a container orchestration cluster's control plane. When a control plane instance is underutilized, it handles control plane requests and monitors its resource usage. If it becomes overutilized (hot state), it identifies another instance with spare resources (cold state) and redirects control plane traffic to it to maintain performance and availability.

18 Claims, 10 Drawing Sheets

CONTAINER ORCHESTRATION CLUSTER 100

CONTAINER ORCHESTRATION CLUSTER 100

LEGEND:
*STEP 1*: ADD INSTANCE.
*STEP 2*: CHECK IF IN COLD STATE AND READY TO RECEIVE AND PROCESS CONTROL PLANE REQUEST TRAFFIC.

CONTAINER ORCHESTRATION CLUSTER 100

LEGEND:
*STEP 1*: RECEIVE CONTROL PLANE REQUEST TRAFFIC IN COLD STATE.
*STEP 2*: MONITOR UTILIZATION AND DETECT HOT STATE.
*STEP 3*: DETERMINE ALL OTHER CONTROL PLANE INSTANCE ARE ALSO HOT.
*STEP 4*: CONTINUE TO RECEIVE AND PROCESS REDIRECTED CONTROL PLANE REQUEST TRAFFIC.

CONTAINER ORCHESTRATION CLUSTER 100

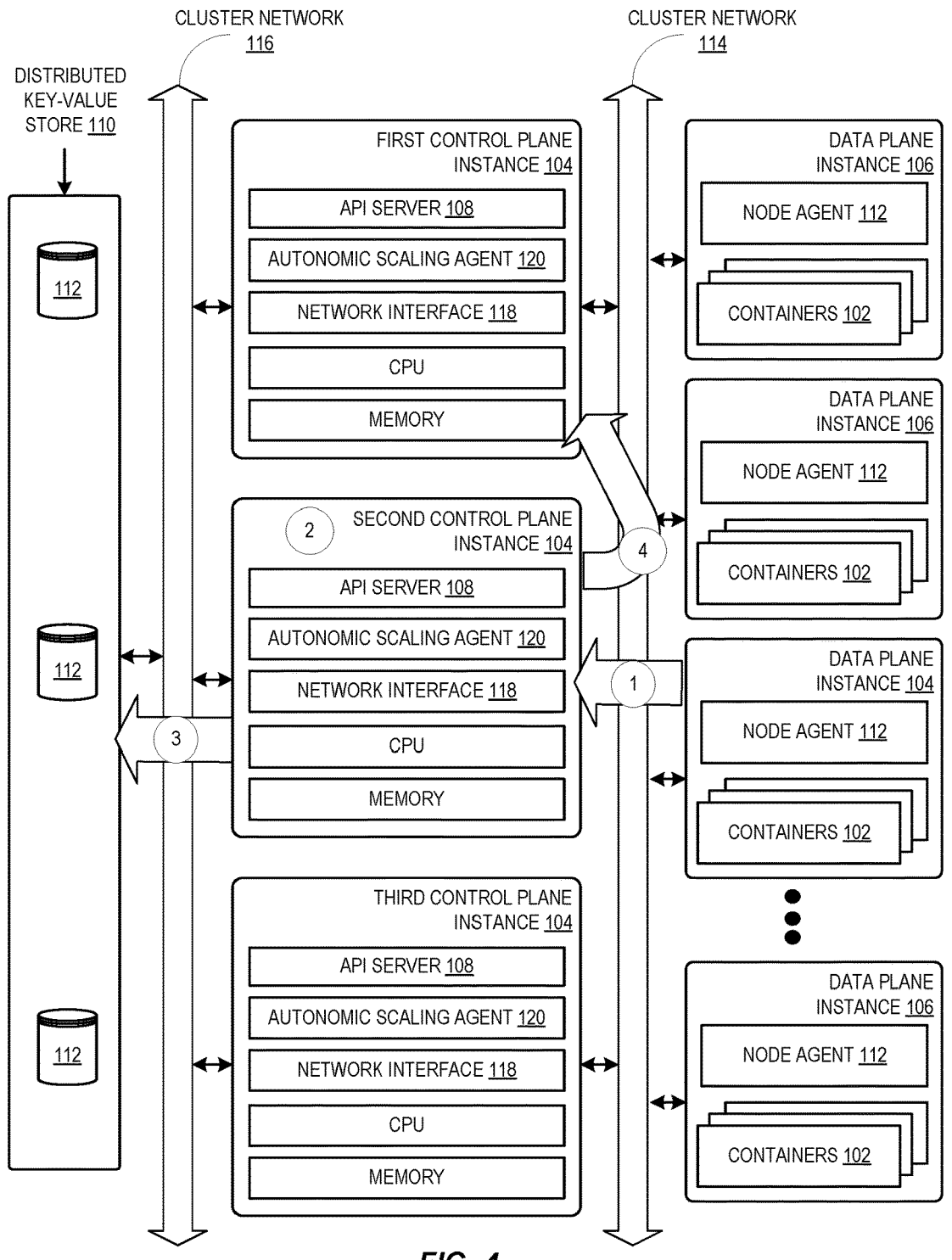

LEGEND:
*STEP 1*: RECEIVE CONTROL PLANE REQUEST TRAFFIC IN COLD STATE.
*STEP 2*: MONITOR UTILIZATION AND DETECT HOT STATE.
*STEP 3*: DETERMINE FIRST CONTROL PLANE INSTANCE IS IN COLD STATE.
*STEP 4*: REDIRECT CONTROL PLANE RQEUEST TRAFFIC TO FIRST INSTANCE..

CLUSTER NETWORK 116

CLUSTER NETWORK 114

DISTRIBUTED KEY-VALUE STORE 110

FIRST CONTROL PLANE INSTANCE 104
API SERVER 108
AUTONOMIC SCALING AGENT 120
NETWORK INTERFACE 118
CPU
MEMORY

112

SECOND CONTROL PLANE INSTANCE 104
API SERVER 108
AUTONOMIC SCALING AGENT 120
NETWORK INTERFACE 118
CPU
MEMORY

112

THIRD CONTROL PLANE INSTANCE 104
API SERVER 108
AUTONOMIC SCALING AGENT 120
NETWORK INTERFACE 118
CPU
MEMORY

112

DATA PLANE INSTANCE 106
NODE AGENT 112
CONTAINERS 102

DATA PLANE INSTANCE 106
NODE AGENT 112
CONTAINERS 102

DATA PLANE INSTANCE 104
NODE AGENT 112
CONTAINERS 102

DATA PLANE INSTANCE 106
NODE AGENT 112
CONTAINERS 102

*FIG. 4*

CONTAINER ORCHESTRATION CLUSTER 100

LEGEND:
STEP 1: DETERMINE FIRST CONTROL PLANE INSTANCE IS IN HOTTER STATE.
STEP 2: REDIRECT AN INCREASED AMOUNT OF CONTROL PLANE REQUEST TRAFFIC.

CONTAINER ORCHESTRATION CLUSTER 100

LEGEND:
*STEP 1*: DETERMINE FIRST CONTROL PLANE IS IN COLD STATE.
*STEP 2*: STOP REDIRECTING CONTROL PLANE REQUEST TRAFFIC.

CONTAINER ORCHESTRATION CLUSTER 100

LEGEND:
STEP 1: DETERMINE FIRST INSTANCE IS IN HOT STATE.
STEP 2: LOCK FIRST INSTANCE IN DISTRIBUTED KEY-VALUE STORE.
STEP3: SECOND INSTANCE RECEIVES CONTROL PLANE REQUEST TRAFFIC IN COLD STATE.
STEP 4: DETERMINE SECOND INSTANCE IS IN HOT STATE.
STEP 5: DETERMINE FIRST INSTANCE IS IN HOT STATE FROM DISTRIBUTED KEY-VALUE STORE.
STEP 6: ADD THIRD INSTANCE TO CONTROL PLANE.
STEP 7: DETERMINING THIRD INSTANCE HAS BEEN ADDED TO CONTROL PLANE FROM KEY-VALUE STORE.
STEP 8: REDIRECT NETWORK TRAFFIC TO NEW INSTANCE.

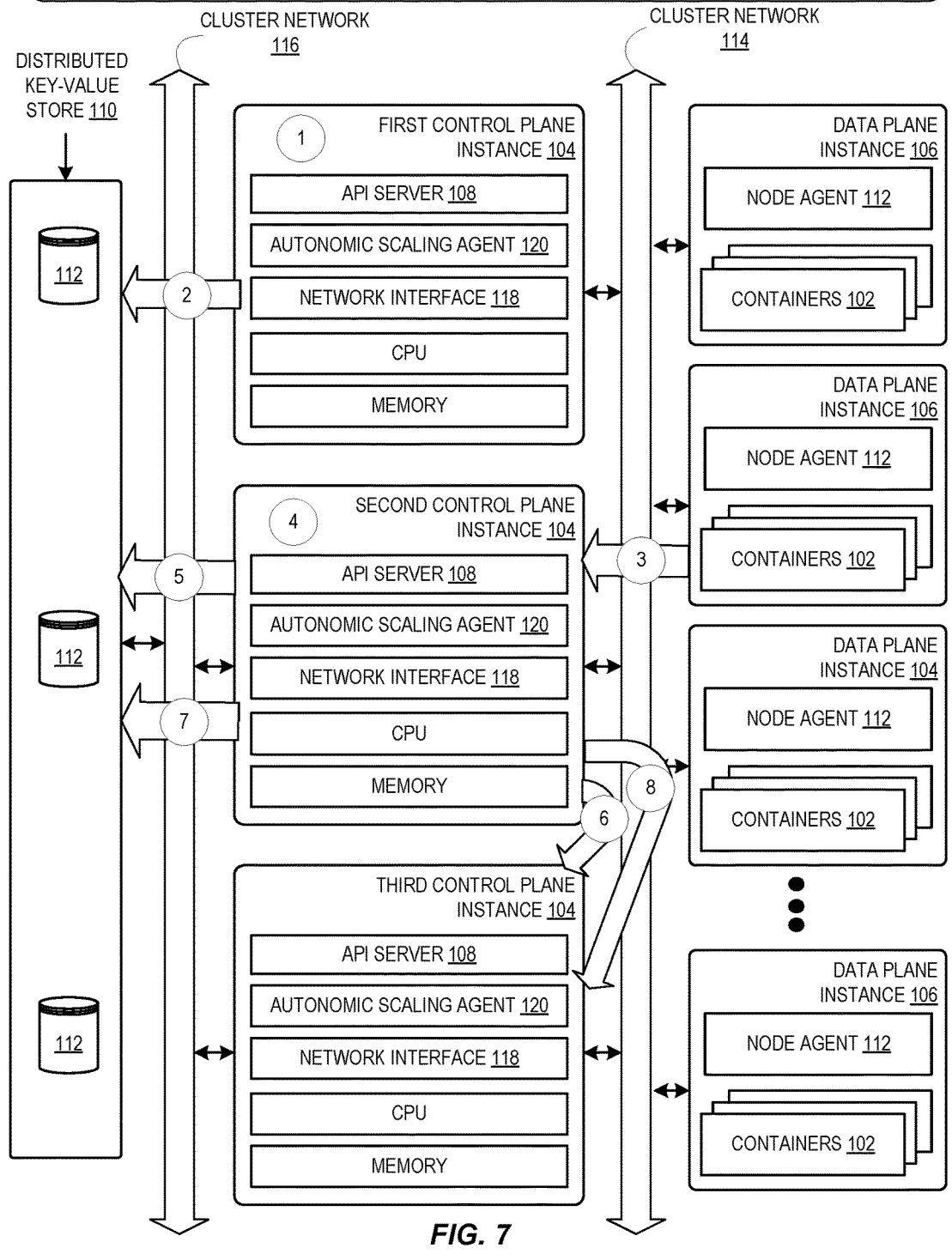

FIG. 7

AUTONOMIC CONTROL PLANE SCALING IN A CONTAINER ORCHESTRATION CLUSTER

BACKGROUND

A container orchestration system is a computer system that automates the deployment, management, scaling, networking, and availability of containerized applications. In the context of container orchestration systems, containers encapsulate a software application's code along with its runtime, system tools, libraries, and settings. Managing these containers at scale, across a distributed infrastructure can be complex.

Some the general features and functions of a container orchestration service may include any or all of: automating the deployment of containers across a cluster of machines; handling the placement of containers based on resources requirements, availability, and other constraints; automatically scaling the number of containers up or down based on the workload or defined policies; providing discovery mechanisms allowing containers to discover and communicate with each other; monitoring the health of containers and automatically replacing containers that fail; managing and allocating resources like CPU, memory, and storage to containers; enforcing resource limits to ensure that one container does not monopolize system resources; and other features and functions.

BRIEF DESCRIPTION OF THE DRAWINGS

The detailed description of certain embodiments of the invention below may be understood by reference to the following figures:

FIG. 4 illustrates a scenario with respect to the example system and method of FIG. 1 involving managing traffic in a container orchestration cluster by redirecting requests from an overloaded second control plane instance to a now underutilized first instance based on their monitored states in a distributed key-value store.

FIG. 7 illustrates a scenario with respect to the example system and method of FIG. 1 involving managing load across a container orchestration cluster by marking an overloaded first control plane instance as locked in a key-value store, scaling out by adding a third instance, and rerouting traffic from a subsequently overloaded second instance to this new, ready-to-receive third instance.

DETAILED DESCRIPTION

Figure 1:
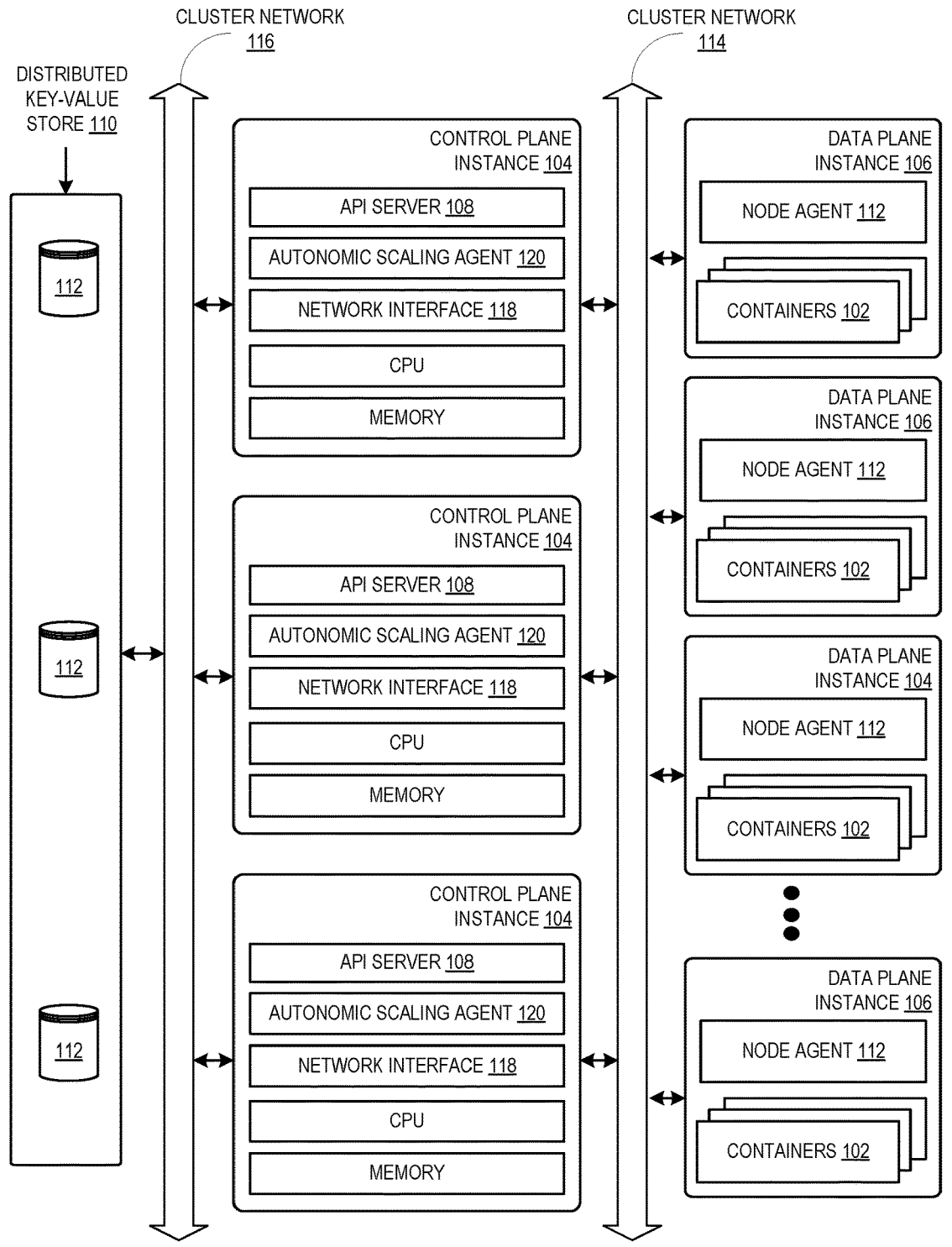
FIG. 1 illustrates an example system and method for autonomic control plane scaling in a container orchestration cluster.

Systems, methods, and non-transitory computer-readable media (generally, "techniques") are disclosed for autonomic control plane scaling in a container orchestration cluster.

The latency of actions taken with respect to automatic scaling of container orchestration systems can affect the usefulness of those systems. Consider an example where nodes in a control plane of a container orchestration cluster are inundated with a burst of request traffic causing the nodes to become overloaded such that the nodes are unable to timely process new request traffic. Automatically scaling the processing capabilities of the existing nodes of the control plane ("vertical scaling") or adding an additional node to the control plane ("horizontal scaling") may alleviate the request pressure on the control plane. The speed with which the scaling is accomplished can be critically important. For example, the longer it takes for the control plane to scale up, then the more request traffic that may suffer untimely request processing.

Techniques described herein address these issues.

Techniques are provided for autonomic control plane scaling in a container orchestration cluster, including, a method for managing a container orchestration cluster's control plane. When a first control plane instance is in a low compute resource utilization state, it receives and processes control plane requests while monitoring its compute resource usage. If it detects that it is in a high compute resource utilization state, it identifies a second control plane instance with low resource usage and redirects control plane request traffic from the first control plane instance to the second instance. This approach helps balance resource utilization in the cluster and ensures cluster availability even during peak loads.

In some embodiments of the above-described method, the first control plane instance triggers the addition of the second control plane instance to the control plane. To determine whether the second control plane instance has entered a low compute resource utilization state, the first control plane instance relies on information stored in a distributed key-value store. Specifically, it checks if the second control plane instance has been successfully added to the control plane and is prepared to handle control plane request traffic. This ensures that the scaling mechanism is efficient and responsive, ensuring optimal resource allocation in the container orchestration cluster.

In some embodiments of the above-described method, the determination made by the first control plane instance regarding the second control plane instance's low compute resource utilization state relies on information stored in a distributed key-value store. Specifically, it checks whether the second control plane instance is not in a lock state. If the second instance is not locked, it is considered to be in a cold compute resource utilization state. This mechanism ensures that only control plane instances that are readily available and not undergoing resource-intensive operations are selected for receiving redirected control plane request traffic, thereby optimizing the cluster's resource allocation and performance.

In some embodiments of the above-described method, when the second control plane instance is in a low compute resource utilization state, it handles control plane requests while monitoring its resource usage. If it detects that it's in a high compute resource utilization state, it checks a distributed key-value store to determine whether all control plane instances in the cluster are also in a high resource utilization state. If this condition is met, it processes control plane request traffic received from the first control plane instance. This approach ensures that all control plane instances work together to efficiently manage control plane request traffic based on their resource states, contributing to the cluster's overall performance and stability.

In some embodiments of the above-described method, when the second control plane instance is in a low compute resource utilization state, it processes control plane requests while monitoring its resource usage. If it detects that it's in a high compute resource utilization state, it checks a distributed key-value store to determine whether the first control plane instance is in a low compute resource utilization state. If the first instance meets this condition, the second control plane instance redirects network traffic containing control plane request traffic from the second control plane instance to the first control plane instance. This approach facilitates resource optimization and load balancing between control plane instances, ensuring efficient handling of control plane requests within the cluster.

In some embodiments of the above-described method, if the first control plane instance detects that it has entered an even higher compute resource utilization state, indicating it is operating at a "hotter" level, it responds by increasing the amount of network traffic containing control plane requests that it redirects from the first control plane instance to the second control plane instance. This dynamic adjustment of network traffic helps to effectively manage the cluster's resource allocation by routing more requests to the second instance when the first one experiences higher resource demand, ensuring that the control plane remains responsive and efficient during peak loads.

In some embodiments of the above-described method, the first control plane instance has an additional action. If it detects that it has entered a "cool" compute resource utilization state, indicating lower resource demand, it stops redirecting network traffic containing control plane requests to the second control plane instance. This behavior ensures efficient resource utilization by reducing the load on the second instance when the first instance is operating with lower resource requirements. It helps maintain an optimal balance in the control plane cluster, with traffic routed according to the real-time resource states of the individual control plane instances, ensuring responsiveness and resource efficiency.

In some embodiments of the above-described method, the first control plane instance is specified as a virtual machine instance. To keep track of the resource utilization of this virtual machine instance, the method involves monitoring its processor utilization. When the processor utilization of the virtual machine instance surpasses a predefined threshold, this serves as the trigger for detecting that the first control plane instance has entered a high compute resource utilization state effectively observing the virtual machine's processor usage to determine whether it's operating with high resource demand, which then guides the decision-making process for load balancing and control plane traffic redirection within the container orchestration cluster.

In some embodiments of the above-described method, the first control plane instance is specified as a virtual machine instance, and this variant of the method involves monitoring the memory utilization of that virtual machine instance to gauge resource usage. The decision regarding whether the first control plane instance is operating in a high compute resource utilization state relies on detecting when the memory utilization of the virtual machine instance surpasses a predefined threshold. In essence, this approach hinges on observing the virtual machine's memory consumption as an indicator of increased resource demand, which in turn guides the management of control plane traffic redirection and resource optimization within the container orchestration cluster.

In some embodiments of the above-described method, the method specifics the process of redirecting network traffic, which includes control plane request traffic, from the first control plane instance to the second control plane instance. This redirection mechanism involves the first control plane instance forwarding Transmission Control Protocol/Internet Protocol (TCP/IP) packets from the first control plane instance to the second control plane instance. In essence, this action facilitates the efficient routing of network traffic within the container orchestration cluster, ensuring that control plane requests are directed to the appropriate control plane instance based on their respective resource utilization states and load conditions.

In some embodiments of the above-described method, the method specifies the process of rerouting network traffic, specifically control plane request traffic, from the first control plane instance to the second control plane instance. This redirection is accomplished by the first control plane instance forwarding Transmission Control Protocol/Internet Protocol (TCP/IP) packets to the second control plane instance while employing network address translation (NAT). NAT is a technique that modifies the source or destination IP addresses in packets as they traverse network boundaries, ensuring that the traffic is correctly directed to the second control plane instance. This approach enables efficient network traffic management within the container orchestration cluster, ensuring that control plane requests are appropriately routed based on resource utilization states and operational conditions.

In some embodiments of the above-described method, the method describes how network traffic, particularly control plane request traffic, is redirected from the first control plane instance to the second control plane instance. This redirection process involves the first control plane instance acting as a proxy for Transmission Control Protocol/Internet Protocol (TCP/IP) packets received from one or more clients of the first control plane instance. These packets are then forwarded or relayed to the second control plane instance. Essentially, this proxying mechanism allows the first control plane instance to serve as an intermediary, efficiently managing network traffic between clients and the second control plane instance, ensuring that control plane requests are appropriately directed based on resource utilization states and operational conditions within the container orchestration cluster.

In some embodiments of the above-described method, the method involves monitoring the utilization of compute resources within the first control plane instance. This monitoring specifically includes tracking the rate at which control plane requests are being received and processed. To identify when the first control plane instance has entered a high compute resource utilization state, the method relies on detecting whether the control plane request rate surpasses a predetermined threshold. In essence, this approach utilizes the control plane request rate as a key metric to determine when the control plane instance is experiencing increased resource demand, guiding decisions related to resource allocation and traffic redirection within the container orchestration cluster.

In some embodiments of the above-described method, the method is extended with additional steps. Upon detecting that the first control plane instance has entered a high compute resource utilization state, it takes action by placing itself in a "lock state" within a distributed key-value store. Meanwhile, a second control plane instance in the cluster operates in a low compute resource utilization state, processing control plane request traffic and monitoring its own resource usage. This control plane cluster comprises multiple instances, including the first and second control plane instances. When the second control plane instance also experiences high resource utilization, it checks the distributed key-value store and identifies that the first control plane instance is in a similar state. In response, it triggers the addition of a third control plane instance to the cluster. Once it confirms that the third control plane instance has been added and is ready to handle control plane requests, it redirects network traffic, including control plane request traffic, from the second control plane instance to the newly added third control plane instance. This dynamic approach helps maintain resource balance and ensures the efficient processing of control plane requests within the container orchestration cluster.

As indicated, minimizing the latency of control plane scaling of a container orchestration cluster can be vitally important to the availability of the cluster. Unfortunately, scaling systems that operate external to the cluster can take too long to react to bursty request loads on the control plane, potentially resulting in an extended period of control plane unavailability or poor performance. So, a solution that can react more quickly is needed. Techniques herein provide autonomic control plane scaling in a container orchestration cluster using a scaling system that operates within the control plane itself. When a control plane instance of the control plane is in a low compute resource utilization state, it receives and processes control plane requests while monitoring its own compute resource usage. If a control plane instance detects that it is in a high compute resource utilization state, the instance identifies another control plane instance with low resource usage and redirects control plane request traffic it receives to the other instance. The other control plane instance can be an existing instance in the control plane or added to the control plane in response to the instance detecting that it is in a high computer resource utilization state.

As an example of a problem addressed herein, consider a container orchestration cluster that starts with two control plane instances in its control plane. The cluster may allow users to configure the number of data plane instances that operate in the data plane of the cluster to meet workload needs. Additionally, or alternatively, the cluster or an external system may be configured to automatically scale the data plane to meet demand. Such scaling of the data plane can cause a burst of request traffic to arrive at the control plane such as, for example, if the number of data plane instances is increased by orders of magnitude. The control plane with only two control plane instances may be incapable of handling this burst of request traffic in a performant manner. Thus, the control plane may also need to be scaled to meet the control plane request demand caused by dramatically scaling the data plane. As such, scaling the control plane can be as important as scaling the data plane.

Scaling the control plane is important not only to meet control plane request demand, but it is also important that the control plane scale quickly. If the control plane is too slow to scale, then the availability of the cluster may be temporarily compromised while the existing control plane instances are overburdened processing the burst of request traffic. The techniques herein provide for rapid control plane scaling to meet request demand caused by rapid or dramatic scaling of the data plane. Further, the techniques apply to more than just rapid scaling in response to scaling of the data plane. They can be used to rapidly scale the control plane in response to a burst of control plane request traffic that originates outside the cluster, or a combination of control plane request traffic some of which originates outside the cluster and some of which originates from the data plane.

Turning now to FIG. 1, it illustrates an example container orchestration cluster 100. The container orchestration cluster 100 is a computer system designed to automate and manage the lifecycle of a set of containers 102 in a large-scale, dynamic environment such as, for example, in a cloud-computing environment. A container 102 is a virtualization method at the operating system level, allowing for lightweight, swift deployment of isolated applications across varied environments. The container orchestration cluster 100 helps in automating tasks such as provisioning and deployment, resource allocation, load balancing, scaling (up or down based on demand), and configuration management of the set of containers 102.

The container orchestration cluster 100 includes two types of nodes (equivalently, "instances"): a set of control plane instances 104 (equivalently, "control plane nodes 104") that handle orchestration and management tasks, and a set of data plane instances 106 (equivalently, "data plane nodes 106" or "worker nodes 106") where the set of containers 102 actually run. The set of control plane instances 104 take care of scheduling the set of containers 102 on the set of data plane instances 106, monitoring the health of the set of data plane instances 106 and the set of containers 102 running on the set of data plane instances 106, managing container workloads to ensure they run as the user intended, and handling failover by restarting containers 102 from failed data plane instances 106 on other data plane instances 106. Multiple data plane instances 106 enable high availability, fault tolerance, and scalability, which can be important for production-grade applications.

A container 102 is a lightweight, stand-alone, and executable software package that encapsulates software components needed to run a piece of software (an application), including the code, runtime, system tools, libraries, and settings. A container 102 is designed to be portable and consistent across different development, testing, and production environments. This portability is achieved by containerization technology, which packages the application and its dependencies together in a "container" that can run on many computing environments with little or no modification, regardless of differences in the underlying infrastructure.

A container 102 can be contrasted to a traditional virtualization approach where an entire virtual machine (including the operating system) is created to run applications, leading to greater resource overhead. A container 102 shares the machine's operating system kernel and isolates the application processes from the rest of the system, making them more efficient, fast, and scalable than virtual machines. Using the set of containers 102, developers can ensure that their applications will run with a degree of functional consistency, regardless of where they are deployed, be it on a local laptop, a physical server in a data center, or in the cloud.

Control plane instances 104 are a component of container orchestration cluster 100. Control plane instances 104 function as the brain of cluster 100, maintaining a record of activities and ensuring cluster 100's state matches the cluster 100's configuration (e.g., configuration set by a user). Control plane instances 104 are responsible for making global decisions about cluster 100 such as, for example, container 102 scheduling decisions, as well as detecting and responding to events in cluster 100 such as starting up a new container when a container fails or when application demand increases.

Each of control plane instances 104 operates as a virtual machine instance. A virtual machine (VM) instance is a software-based emulation of a physical computer that facilitates the running of an entire operating system and its applications in a self-contained, isolated environment on a host server. Unlike a physical server that is bound by its hardware, a VM instance abstractly emulates hardware components, enabling it to operate independently and making it possible to run multiple virtual machine instances on a single physical machine, each with its own operating system and applications.

This emulation is managed by a hypervisor, which is software, firmware, or hardware that creates and runs virtual machine instances by separating the machine's physical resources from the virtual environments and appropriately allocating those resources among them. The virtual machine instance acts like a physical computer with its own central processing unit(s), memory, network interface(s), storage, and other hardware resources, albeit virtualized. This virtualized setup allows for greater flexibility, security, and resource efficiency. For instance, developers can create and test applications on virtual machine instances with different operating systems on the same physical host or rapidly deploy replicated environments. Virtual machine instances also offer a level of portability, disaster recovery, and load balancing advantages by being able to snapshot, clone, move, and manage easily across underlying infrastructure. Virtual machine instances are often used in cloud computing platforms where virtual machine instances are provisioned and utilized on-demand with the desired specifications to scale and manage applications and services.

Control plane instances 104 include application programming interface (API) servers 108. API servers 108 is a control plane component that runs on each of control plane instances 104 in cluster 100. API servers 108 acts as the front-end for the control plane of cluster 100, processing Representational State Transfer (REST)-ful or like requests to manage the various parts of cluster 100, such as pods, services, replication controllers, and others. API servers 108 serve as the central management entity for cluster 100 and interacts directly with distributed key-value store 110 to retrieve the state of objects and update them.

When a user or a service inside cluster 100 wants to interact with cluster 100, they use API servers 108. API servers 108 provide mechanisms for authentication, authorization, API registration and discovery, and admission control, implementing controls to ensure consistency and validity of control plane requests. API servers 108 may be stateless by design, with state information stored in distributed key-value store 110. Each instance of API servers 108 may thus be interchangeable, allowing cluster 100 to be resilient and maintain uptime even if one or more instances fail.

REST stands for Representational State Transfer. It is an architectural style for designing networked applications or systems. REST relies on a stateless, client-server, cacheable communications protocol—in many cases, the HyperText Transfer Protocol (HTTP). API servers 108 in the control plane functions as the central management entity for the cluster, and it uses a RESTful approach for client-server interaction. By adhering to REST principles, API servers 108 expose a set of HTTP endpoints that correspond to cluster 100 operations for managing and orchestrating containerized applications.

Clients, internal controllers, or external systems, interact with API servers 108 by making HTTP requests using GET to retrieve cluster state, POST to create resources, PUT to replace resources, PATCH to update resources partially, and DELETE to remove resources. Each of these operations is mapped to specific API paths and is associated with the various cluster 100 resources like pods, deployments, and services. These HTTP requests and responses are typically structured in JavaScript Object Notation (JSON) or Yet-Another Markup Language (YAML) format, offering a clear, human-readable, and machine-parsable representation of cluster 100 objects.

When API server 108 receives a request, it processes it by executing a series of steps: authenticating the requestor, authorizing the request, validating the requested action, and persisting the changes to distributed key-value store 110 cluster if needed. The state of cluster 100 is stored in distributed key-values store 110, a consistent and highly available key-value store that cluster 100 uses to keep track of cluster data.

API servers 108 in the control plane is the central command hub for cluster 100, and it receives a range of request traffic aimed at managing and orchestrating the state and behavior of cluster 100. This traffic includes requests for creating, reading, updating, and deleting resources such as pods, services, replication controllers, and persistent volumes. For instance, when a developer uses a command-line tool to deploy a new containerized application, API server 108 that receives the command processes the creation of the necessary deployment and service objects. As another example, a continuous integration system might make requests to update existing applications with new container images upon a successful build.

API servers 108 may also field queries from other control plane components (not shown in FIG. 1) seeking to maintain the desired state of cluster 100. For example, a scheduler of the control plane may communicate with API servers 108 to find unscheduled pods and then place them on appropriate data plane instances 106. As another example, controllers of the control plane may continuously watch API servers 108 for their respective resources and take actions to reconcile the current state with a desired state.

Beyond internal cluster 100 operations, API servers 108 is the endpoint for health checks and load balancers, which frequently verify the availability and responsiveness of the control plane. API servers 108 handles authentication and authorization checks for all incoming requests, ensuring only legitimate and authorized operations are executed. Data plane instances 106, custom controllers, and operators also send requests to watch for changes in resources they manage or depend upon, enabling dynamic and real-time responses to the evolving state of cluster 100.

API servers 108 receive and process a complex and continuous stream of request traffic that includes commands from human operators, internal cluster 100 components, external integrations, or automated systems, some or all of which coordinate to manage the lifecycle of containerized applications and ensure cluster 100 operates as intended.

In cluster 100, data plane instances 106 are responsible for running the containerized applications 102, whereas control plane instances 104, with API servers 108 as its central component, manages the overall cluster 100 and orchestrates data plane instances 106.

Increasing the number of data plane instances 106 in the data plane of cluster 100 raises the request load on the control plane of cluster 100, particularly on API servers 108. Each data plane instance 106 hosts node agent 112 that typically must regularly communicate with API servers 108 to receive instructions and report the status of the pods it manages. As more data plane instances 106 are added to cluster 100, the number of node agents 112 making these requests of the control plane also increases.

Furthermore, node agents 112 running on data plane instances 106 may lead to more frequent scaling events, health checks, and updates, all of which translate to additional API calls. More data plane instances 106 also means a larger number of pod schedules, reschedules in case of failures of data plane instances 106, and inter-pod communication configurations that API servers 108 of the control plane must handle. Additionally, each data plane instance 108 may have its own set of controllers and resources like configuration maps, secrets, and persistent volume claims that need to be watched and updated, contributing to request load on control plane instances 104.

This increased activity demands more processing power, memory, and network throughput from control plane instances 104 to maintain cluster 100's desired state. If the resources of control plane instances 104 are not scaled appropriately and timely, the extra load can lead to performance bottlenecks, slower response times, and ultimately, can affect the stability and reliability of cluster 100 operations. Therefore, as cluster 100 scales horizontally with more data plane instances 106, it can be important to monitor the performance of control plane instances 104 and scale control plane instances 104 vertically or horizontally as needed and in a timely manner to ensure that control plane instances 104 can handle the additional operational demands effectively.

Node agent 112 runs on each data plane instance 106 in cluster 100. Its fundamental role is to ensure that containers 102 are running in a pod. It takes a set of pod specifications, which are YAML or JSON objects that describe a pod and ensures that containers 102 described in those pod specifications are running and healthy. When node agents 112 starts up, it registers with API servers 108, making it available to run pods. It then watches API servers 108 for new or changed pod specifications and acts accordingly by starting, stopping, or restarting the containers specified in these pod specifications via the container runtime. Node agents 112 also monitor the state of these pods and containers 102 and reports back to API servers 108, keeping the control plane informed of the state of both healthy and unhealthy pods. Furthermore, node agents 112 are responsible for maintaining a set of node-specific resources such as managing node agents 112s' network configuration, allocating system resources of data plane instance 106 like CPU and memory, and handling storage, including the mounting and unmounting of volumes at data plane instances 106. It also manages pod lifecycle events and executes necessary actions to maintain the pods' lifecycle state, such as pod lifecycle hooks. The actions performed node agents 112 require making requests of API servers 108 where the greater number of data plane instances 106 (and consequently the greater number of node agents 112) causes a greater request load on API servers 108 and consequently greater resource usage of control plane instances 104.

Distributed key-value store 110 a component of cluster 100, functioning as the backbone of cluster 100's storage mechanism. It is a highly available key-value store that cluster 100 uses for persistently storing cluster 100 data. This includes the configuration data, state information, and metadata that cluster 100 needs to manage its resources and to keep track of the overall state of cluster 100. Distributed key-value store 110 is designed to be distributed, meaning it runs on multiple machines in a cluster configuration for high availability and robustness. It forms the consensus on the state of cluster 100 among multiple control plane instances 104 in the control plane.

Control plane components, such as API servers 108, interact with distributed key-values store 110 to read and write data. For example, a new service or deployment is created in cluster 100, API servers 108 stores this information in distributed key-value store 110, from where it can be retrieved and watched by other parts of cluster 100. The consistent and reliable nature of distributed key-value store 110 allows cluster 100 to manage and orchestrate containerized applications with a high degree of fault tolerance.

As a consistent and ordered key-value store, distributed key-value store 110 is suited to serve as the main data source of truth for a distributed system like cluster 100. It uses the Raft consensus algorithm or other suitable consensus protocol to manage a highly available replicated log, ensuring that distributed key value store 110 continues to function even in the case of hardware failures or network partitions. With its focus on consistency, database members 112 of distributed key-value store 110 need to eventually agree on the updates to the database, ensuring that the data remains consistent across control plane instances 104 of control plane.

Each of control plane instances 104 includes at least one network interface 118. Network interface 118 is a software or hardware boundary that serves as the junction point between control plane instance 104 and a network infrastructure, enabling communication over a network protocol such as Transmission Control Protocol/Internet Protocol (TCP/IP). With respect to hardware, network interface 118 can encompass an Ethernet port, a wireless adapter, or any other physical device that allows a computer to connect to an external network such as cluster network 114 and cluster network 116. Each of network interfaces 118 is assigned at least one Internet Protocol (IP) address that uniquely identifies it and enables network communication.

In the context of software, network interface 118 can refer to the virtual interface created by the operating system or networking software. This includes a virtual network interface provided by a virtual machine instance, container instance, or virtual network within a cloud environment. A virtual interface simulates the functionalities of physical hardware and allows software processes to communicate over networks just like physical devices.

Network interface 118 acts as a gatekeeper, handling the ingress and egress of data packets according to specific protocols. It encapsulates outbound data from control plane instance 104 into packets suitable for network transmission and decapsulates inbound packets for control plane instance 104 to process. This encapsulation includes the addition of headers and sometimes footers to the data, which carry essential control information, such as source and destination Internet Protocol (IP) addresses, port numbers, and data payload length.

On control plane instances 104, network interfaces 118 are usually managed by the operating system's networking stack, which implements the various protocols necessary for communication (e.g., Internet Protocol (IP), Transmission Control Protocol (TCP), User Datagram Protocol (UDP)) and provides Application Programming Interfaces (APIs) for applications such as API servers 108 and autonomic scaling agents 120 to send and receive data over cluster network 114 or cluster network 116.

Each control plane instance 104 is configured with an autonomic scaling agent 120. In operation, while a first control plane instance 104 is in a cold compute resource utilization state, the API server 108 of the first control plane instance 104 receives and processes control plane request traffic and the autonomic scaling agent of the first control plane instance 104 monitors utilization of one or more compute resources (e.g., CPU, memory, network bandwidth, or disk I/O) of the first control plane instance 104. When the first control plane instance 104 is in a "cold compute resource utilization state," then utilization of the one or more compute resources of the first control plane instance 104 is below one or more predefined thresholds. In this cold state, the API server 108 of the first control plane instance 104 is responsive to incoming control plane request traffic which may encompass, for example, administrative commands, resource queries, or orchestration tasks.

While the API server 108 receives and processes such control plane request traffic, the autonomic scaling agent 120 within the first control plane instance 104 monitors one or more compute resource utilization metrics of the one or more underlying compute resources of the first control plane instance 104. For example, the one or more underlying compute resources of the first control plane instance 104 that are monitored by the autonomic scaling agent 120 may include one or more virtual CPUs or the virtualized memory of the virtual machine instance that operates as the first control plane instance 104.

The autonomic scaling agent 120 of the first control plane instance 104 may detect when the first control plane instance 104 enters a "hot compute resource utilization state," which signifies that the demand on the one or more compute resources of the first control plane instance 104 is relatively high, with utilization of the one or more compute resources approaching or exceeding one or more predefined thresholds. Such demand may be caused by the API server 108 of the first control plane instance 104 receiving and processing control plane request traffic. Autonomic scaling agent 120 monitors one or more system metrics of the first control plane instance 104, such as virtual CPU load, usage of virtualized memory, network throughput, and disk input/output operations, to gauge the first control plane instance 104's health and workload intensity.

The detection of a hot state by the autonomic scaling agent 120 of the first control plane instance 104 is triggered by one or more of these metrics surpassing certain points that are indicative of high compute resource demand on the first control plane instance 104. For example, virtual CPU utilization of the first control plane instance 104 might spike above 80%, virtualized memory could be nearing fully capacity, or network bandwidth to or from the first control plane instance 104 may become saturated due to the volume of incoming or outgoing network traffic to or from the first control plane instance 104. The autonomic scaling agent 120 of the first control plane instance 104 can be configured to capture these one or more metrics in real-time or periodically (e.g., via polling) from an operating system or other application or applications of the first control plane instance 104 that produces the one or more metrics.

Because the autonomic scaling agent 120 runs on the first control plane instance 104, it can quickly detect a transition of the first control plane instance 104 from a cold state to a hot state. For example, rapid detection may be facilitated by real-time analytics and threshold-based alarms that are configured to closely observe critical performance metrics. As another example, the autonomic scaling agent 120 at the first control plane instance 104 may employ a continuous polling or event subscription model that allows it to receive instant updates on system parameters like CPU load percentages, memory usage, I/O operations, and network traffic. As soon as the utilization of one or more of these resources approaches a higher operational threshold, the autonomic scaling agent 120 on the first control plane instance 104 may be alerted through an active monitoring channel. For example, if the virtual CPU utilization of the first control plane instance 104 crosses a set point such as, for example, 70% of its capacity, this could be interpreted by the autonomic scaling agent 120 at the first control plane instance 104 as an indication that the first control plane instance 104 is entering a hot state.

In some embodiments, the agility in detection is also a result of predefined performance baselines and heuristic analyses that can predict trends based on current and historical data (e.g., using a pre-trained machine learning model for time-series prediction), enabling the autonomic scaling agent 120 of the first control plane instance 104 to not only react to the present state but also to anticipate imminent shifts towards high resource demand. Once a hot state is detected, the autonomic scaling agent 120 of the first control plane instance 104 responds according to the scaling policies in place, which can involve auto-scaling actions like launching additional control plane instances into the control plane, thus distributing the load and mitigating the hot state without manual intervention.

When an autonomic scaling agent 120 of a control plane instance 104 detects that the control plane instance 104 has transitioned from a cold compute resource utilization state to a hot compute resource utilization state, the autonomic control plane instance 120 of the control plane instance 104 causes the control plane instance 104 to marked as locked in distributed key-value store 110. This marking may involve the autonomic scaling agent 120 of the control plane instance 104 requesting the API server 108 of the control plane instance 104 to set one or more values of one or more particular keys in the distributed key-value store 110 to indicate that the control plane instance 104 is locked. The lock state indicates that the control plane instance 104 is in a hot state and is otherwise not available to process control plane request traffic redirected to it from other control plane instances in cluster 100.

When the autonomic scaling agent 120 of the control plane instance 104 detects that the control plane instance 104 is no longer in the hot state and has transitioned back to the cold state (e.g., because one or more compute resource utilization metrics for the control plane instance drop below one or more predefined thresholds), the autonomic scaling agent 120 of the control plane instance 104 causes the control plane instance 104 to marked as not locked or unlocked in distributed key-value store 110. This marking may involve the autonomic scaling agent 120 of the control plane instance 104 requesting the API server 108 of the control plane instance 104 to set one or more values of one or more particular keys in the distributed key-value store 110 to indicate that the control plane instance 104 is not locked or unlock. Additionally, or alternatively, this marking may involve the autonomic scaling agent 120 of the control plane instance 104 requesting the API server 108 of the control plane instance 104 to remove one or more particular keys from the distributed key-value store 110 to indicate that the control plane instance 104. The not locked or unlocked state indicates that the control plane instance 104 is in a cold state or is otherwise unavailable to process control plane request traffic redirected to it from other control plane instances in cluster 100.

Distributed key-value store 110 is used by autonomic scaling agents 120 as a signaling mechanism to signal each other when they are and are not in the locked state. As mentioned, distributed key-value store 110 provides a reliable way to store data across a cluster of machines 112. It is the backbone of cluster 100 for storing and replicating configuration data and state information. Distributed key-value store 110 may use the Raft consensus algorithm or other consensus protocol to maintain a strong consistency model; when data is written to one member 112, it is replicated to other members 112 in store 110 to ensure that every member agrees on the state of the system. Distributed key-value store 110 may be viewed as a strongly consistent where every read receives the most recent write. However, there can be scenarios where reads might be slightly behind writes, leading to an appearance of eventual consistency. Such scenarios include leader election delay, reads from follower members 112, network partitions, a snapshot catch-up, among other possible scenarios where store 110 is temporarily unable to meet its strong consistency guarantees.

Data replication between members 112 typically happens rapidly (e.g., on the order of milliseconds) and is a function of the communication speed between the members 112, the processing time required to reach consensus, and the commit of the data to each member 112's log. When a write operation is initiated, it is proposed to store 110, and the consensus algorithm orchestrates the replication process across a quorum of members 112 before the write is considered committed. This typically happens in a matter of milliseconds, but actual performance can depend on the size of the data being written, the network latency, and the current load on members 112.

In some embodiments, distributed key-value store 110 supports a mode where read requests can be served from a local member 112's store without guaranteeing that it reflects the most recent write, this mode can improve read performance at the cost of not always providing the latest data. If a network partition happens, or if a client reads from a local member 112 that has not yet received the latest update, then the client might read stale data. Once the partition heals or the local member 112 receives the update, the store 110 becomes consistent again.

Store 110 replicates data as fast as possible while still ensuring strong or eventual data integrity and consistency making it suitable as a quick, reliable mechanism for autonomic scaling agents 120 to signal each other when their respective control plane instances 104 are and are not in the locked state. When one autonomic scaling agent 120 needs to inform other autonomic scaling agents 120 of a state change, it may do so by inserting, modifying, or removing one or more particular keys within store 110 (e.g., via API server 108). The other autonomic scaling agents 120 may maintain a "watch" on the one or more relevant keys.

The watch mechanism provided by store 110 allows a client watching a key to be notified of any updates to the key in store 110 by other clients. For example, when an autonomic scaling agent 120 at one control plane instance 104 updates the value of key in store 110 to indicate that the control plane instance 104 is in a locked state, store 110 triggers a watch event for the key, which is received by one or more other autonomic scaling agents 120 at one or more other control plane instances 104 that are watching the same key. This event acts as a signal, informing the other autonomic scaling agent(s) 120 that the locked control plane instance 104 is not available to receive and process control plane request traffic from the other control plane instance(s) 104. Because, as mentioned, data replication between members 112 of store 110 happens quickly (e.g., typically on the order of milliseconds), using the watch mechanism of store 110 provides a quick and reliable way for autonomic scaling agents 120 to signal each other of state changes without having to directly communicate with each other according to an application layer networking protocol that is specific to autonomic scaling agents 120.

Upon the autonomic scaling agent 120 of the first control plane instance 104 detecting that the first control plane instance 104 is in a hot state, the autonomic scaling agent 120 of the first control plane instance 104 initiates a predefined scaling protocol to mitigate the risk of performance degradation or system overload. This involves the autonomic scaling agent 120 at the first control plane instance 104 determining that a second control plane instance 104 of the control plane that is in a cold compute resource utilization state. This can happen in at least two ways.

In a first way, the second control plane instance 104 is an existing control plane instance of the control plane (existing at the time the first control plane instance 104 transitions from the cold state to the hot state). In this case, the autonomic scaling agent 120 at the first control plane instance 104 can discover that the second control plane instance 104 is in the cold state by reading the one or more relevant keys from store 110 whose value or values indicate whether the second control plane instance 104 is in the cold state. In some cases, the absence of the one or more relevant keys in store 110 indicate that the second control plane instance 104 is in the cold state. Note that the autonomic scaling agent 120 at the first control plane instance 104 can continuously watch the one or more relevant keys in store 110. In this case, the autonomic scaling agent 120 at the first control plane instance 104 may be notified via the watch that the second control plane instance 104 is in the cold state before the first control plane instance 104 transitions to the hot state. The absence of subsequent update to the one or more relevant keys in store 110 by the time the first control plane instance 104 transitions to the hot state can be interpreted by the autonomic scaling agent 120 at the first control plane instance 104 that the second control plane instance 104 is still in the cold state.

In the second way, the autonomic scaling agent 120 at the first control plane instance 104 causes the second control plane instance 104 to be added to the control plane as a new control plane instance in response to detecting that the first control plane instance 104 has transitioned to the hot state. The autonomic scaling agent 120 at the first control plane instance 104 can cause the second plane instance 104 to be launched and added to the control plane after determining that all existing control plane instances 104 are in the locked state and currently unavailable to accept redirected control plane request traffic.

Once the second control plane instance 104 has been added to the control plane, it may register itself via the API server 108 of the second control plane instance 104 in the distributed key-value store 110 by creating or modifying one or more relevant keys in distributed key-value store 110. The autonomic scaling agent 120 at the first control plane instance 104 can watch those relevant key(s) to detect when the second control plane instance 104 is ready to accept redirected control plane request traffic from it. After detecting that the second control plane instance 104 has registered itself in the distributed key-value store 110, the autonomic scaling agent 120 at the first control plane instance 104 can detect that the second control plane instance 104 is in the cold state based on the absence of one or more relevant keys in distributed key-value store 110 that indicate that second control plane instance 104 is in the hot state or based on the presence of one or more relevant keys in store 110 that indicate that the second plane instance 104 is in the cold state.

In some embodiments, the autonomic scaling agent 120 determines that the second control plane instance 104 is in the cold state based on detecting that the second control plane 104 has registered itself in the distributed key-value store 110. This determination can be based on the typically short amount (a matter of milliseconds) of time between when the automatic scaling agent 120 registers itself in the store 110 and when the automatic scaling agent 120 of the first control plane instance 104 is notified of this registration and the low probability that the second control plane instance 104 will transition to the hot state in such a short amount of time.

The autonomic scaling agent 120 of the first control plane instance 104 causing the second control plane instance 104 to be launched and added to the control plane may involve a combination of orchestration, automation, and virtualization technologies. When the autonomic scaling agent 120 of the first control plane instance 104 determines a need to add a new control plane instance to the control plane (e.g., because all existing control plane instances are locked), the autonomic scaling agent 120 of the first control plane instance 104 triggers an automation sequence. This sequence begins with the autonomic scaling agent 120 of the first control plane instance 104 signaling the underlying infrastructure to provision a new virtual machine. This can be done, for example, through an Application Programming Interface (API) call to the infrastructure provider, which could be a cloud service or an on-premises hypervisor. The API can specify specifies the virtual machine's size, network configuration, security settings, and the image to be used, which contains the pre-installed control plane instance components such as the API server 108, the autonomic scaling agent 120, and the network interface 118, among other components (e.g., an operating system).

Once the infrastructure provider or on-premises hypervisor receives the API call, it allocates the necessary compute, storage, and network resources, and initiates the VM creation process using the specified image. This image can be a pre-configured snapshot of an existing control plane instance or a generic image with the necessary components that can be configured after boot-up. The virtual machine is then booted up and goes through initial setup procedures, such as configuring network interfaces, setting up cryptographic keys, and applying security patches.

After the virtual machine instance is up and running, further configuration is handled by automated scripts or configuration management tools that install any remaining components, join the virtual machine to the control plane of cluster 100, and synchronize it with the current control plane state. This may involve obtaining the necessary certificates and configuration data to interact securely with the cluster 100 and initializing services like the API server 108 at the new control plane instance.

The new virtual machine is then introduced to the cluster 100 as a new control plane instance through a join command using a bootstrap token and other required credentials. Once joined, it takes part in the consensus protocol, receives updates, and can handle API requests and manage workloads, effectively becoming a part of the control plane. After joining the control plane, the new control plane instance registers itself with the cluster 100, and the new instance appears in the list of control plane instances that are part of cluster 100 in the distributed key-value store 110.

In some embodiments, a virtual machine instance is pre-provisioned so that it can be quickly added to the control plane. In this case, the virtual machine instance may be provisioned, booted up, and configuration scripts run before the autonomic scaling agent 120 at the first control plane instance 104 determines to add a new control plane instance to the control plane. To add the pre-provisioned virtual machine instance to the control plane as the new control plane instance, the autonomic scaling agent 120 at the first control plane instance 104 may need only to cause the pre-provisioned virtual machine instance to join the control plane, which may be accomplished in a matter of seconds. By pre-provisioning the virtual machine instance, time-consuming provisioning, bootstrapping, and configuration tasks (which may take minutes to complete) are already completed when it comes time to add the virtual machine instance to the control plane as a control plane instance.

Pre-provisioning a virtual machine instance to be added as a control plane instance to the control plane of cluster 100 involves preparing a virtual machine instance with components and configurations for it to function as part of the control plane. The goal of pre-provisioning is to streamline the addition of the new control plane instance to the cluster 100 when needed, reducing the time and complexity involved in scaling up the control plane.

The pre-provisioning process starts with selecting a base image or operating system that is compatible with the control plane of cluster 100. The virtual machine instance is then instantiated with this image automatically or using an infrastructure provider's management console, CLI, or API. Once the virtual machine instance is running, security configurations such as firewall rules, SSH keys, or security patches may be applied to ensure the instance complies with the cluster 100's security standards.

Next, control plane components such as the API server 108, autonomic scaling agent 120, and network interface 118 are installed. To ensure consistency with the existing control plane instances, specific versions of these components may be selected based on the cluster 100's current version. The configuration files and certificates for these components to communicate securely with the rest of the cluster 100 may also be set up, but they might not be fully activated or connected to the cluster 100 at this stage.

Networking plays a role in the functionality of the control plane instance. Therefore, network configurations, including the setup of necessary virtual networking interfaces, routing rules, and Domain Name Service (DNS) settings, are configured to match the cluster 100's existing network topology. Load balancing and failover mechanisms may also be set up if the cluster 100 uses these for managing control plane traffic.

The pre-provisioned virtual machine instance may also equipped with cluster management tools and any necessary automation scripts. These tools may later be used to finalize the virtual machine instance's integration into the cluster 100. The instance's API server 108 may be installed but remain in a standby mode, awaiting activation.

At this point, the virtual machine instance is essentially a fully configured control plane instance that is not yet active within the cluster 100. It remains in a standby or "cold" state where it consumes minimal resources. When the time comes to scale the control plane, the pre-provisioned virtual machine instance can be quickly activated, its components started, and then it can join the cluster using a join process. This significantly reduces the time required to bring a new control plane instance online since the majority of the setup work has been completed in advance.

After the autonomic scaling agent 120 of the first control plane instance 104 determines that the second control plane instance 104 is in the cold state, the autonomic scaling agent 120 at the first control plane instance 104 redirects network traffic encompassing control plane request traffic from the first control plane instance 104 to the second control plane instance 104 while the first control plane instance 104 remains in the hot state. The network traffic may encompass Transmission Control Protocol (TCP) or Internet Protocol (IP) networking packets carrying control plane request traffic in their payloads.

The autonomic scaling agent 120 of the first control plane instance 104 is a software component designed to autonomously manage the scaling of the control plane from within the first control plane instance 104. When the autonomic scaling agent 120 of the first control plane instance 104 determines that the first control plane instance 104 needs to redirect traffic to the second instance to balance load or due to high utilization, the autonomic scaling agent 120 of the first control plane instance 104 can programmatically adjust the network configuration of the network interface 118 of the first control plane instance 104 to achieve this.

For example, the autonomic scaling agent 120 of the first control plane instance 104 may interact with the underlying operating system of the first control plane instance 104 to modify the network settings of the network interface 118 of the first control plane instance 104. For example, the autonomic scaling agent 120 of the first control plane instance 104 may use iptables, a Linux command line firewall, to set up rules that redirect traffic. In this case, the autonomic scaling agent 120 of the first control plane instance 104 may specify rules that match the TCP/IP packets designated for control plane operations—identified by specific ports (like 443 for API server 108 traffic)—and redirect them to the IP address of the second control plane instance 104.

The result of redirecting traffic is that incoming traffic intended for the API server 108 of the first control plane instance 104 would be redirected to the API server 108 of the second instance 104. This is done in response to monitoring data indicating the first instance 104 is over-utilized or as part of a proactive scaling strategy to prevent the first instance from becoming a bottleneck. By automating this process, the autonomic scaling agent 120 ensures that the cluster 100 including the control plane remains responsive and that the load is distributed across available resources, without manual intervention.

In some embodiments, redirecting network traffic from the first control plane instance 104 to the second control plane instance 104 involves the autonomic scaling agent 120 of the first control plane instance 104 configured the network interface 118 of the first control plane instance 104 to forward TCP or IP packets at the network layer with network address translation. In this case, the network interface 118 of the first control plane instance 104 is configured to use protocols and routing tables to direct incoming data packets to the second control plane instance 104. In doing so, the network interface 118 of the first control plane instance 104 may change the source network address of the incoming packets to be a network address of the network interface 118 of the first control plane instance 104. By using network address translation, the second control plane instance 104 can differentiate based on the source network address of network packets carrying control plane request traffic between (a) network traffic that is being redirected from another control plane instance in the control plane and (b) network traffic that is not being redirected.

In some embodiments, redirecting network traffic from the first control plane instance 104 to the second control plane instance 104 involves forwarding TCP or IP packets at the network layer without network address translation. In this case, the network interface 118 of the first control plane instance 104 is configured to use protocols and routing tables to direct incoming data packets to the second control plane instance 104 without modifying the source network address of the network packets. In essence, the first control plane instance 104 functions as a router without the complexity of network address translation.

In some embodiments, redirecting network traffic from the first control plane instance 104 to the second control plane instance 104 involves proxying TCP or IP packets. In this case, the first control plane instance 104 acts via its network interface 118 as an intermediary for control plane request traffic from clients of the first control plane instance 104. With proxying, TCP connections with the clients may terminate at the first control plane instance 104 and the autonomic scaling agent 120 at the first control plane instance 104 configures the first control plane instance 104 to establish additional TCP connections with the second control plane instance 104. The TCP packets received by the first control plane instance 104 over the TCP connections established with the clients are redirected over the TCP connections established with the second control plane instance 104. By proxying, the first control plane instance 104 can perform higher-level operations on the redirected control plane request traffic other than merely forwarding the control plane request traffic such as inspecting, modifying, or making decisions based on the content of the content plane request traffic such as rewriting control plane requests or load balancing decisions at the granularity of individual control plane requests.

Redirecting network traffic need not be an all or nothing proposition. When the autonomic scaling agent 120 of the first control plane instance 104 decides to redirect network traffic to the second control plane instance 104, it can redirect a percentage of the network traffic it receives while handling the remaining network traffic it receives. For example, the autonomic scaling agent 102 of the first control plane instance 104 may initially redirect 50% of the received network traffic. It may then continue to monitor one or more compute resources of the first control plane instance 104 and if the associated one or more metrics continue to rise, then the autonomic scaling agent 102 of the first control plane instance 104 may increase the amount of network traffic redirected to 60%. This increase may continue in a stepwise fashion (e.g., at 5% to 10% increments) until the one or more metrics show that utilization of the one or more compute resources of the first control plane instance 104 has reached a steady state or is now declining.

Cluster network 116 connects control plane instances 104 to distributed key-value store 110 and also connects members 112 to each other. Cluster network 114 connects data plane instances 106 to control plane instances 104 and also connects control plane instances 104 to each other.

A scenario with respect to the example system and method of FIG. 1 involves the first control plane instance 104 dynamically redirecting control plane request traffic within the container orchestration cluster 100 from itself as an overloaded (hot) control plane instance to the second control plane instance 104 as an underutilized (cold) one to balance the compute resource utilization.

Figure 2:
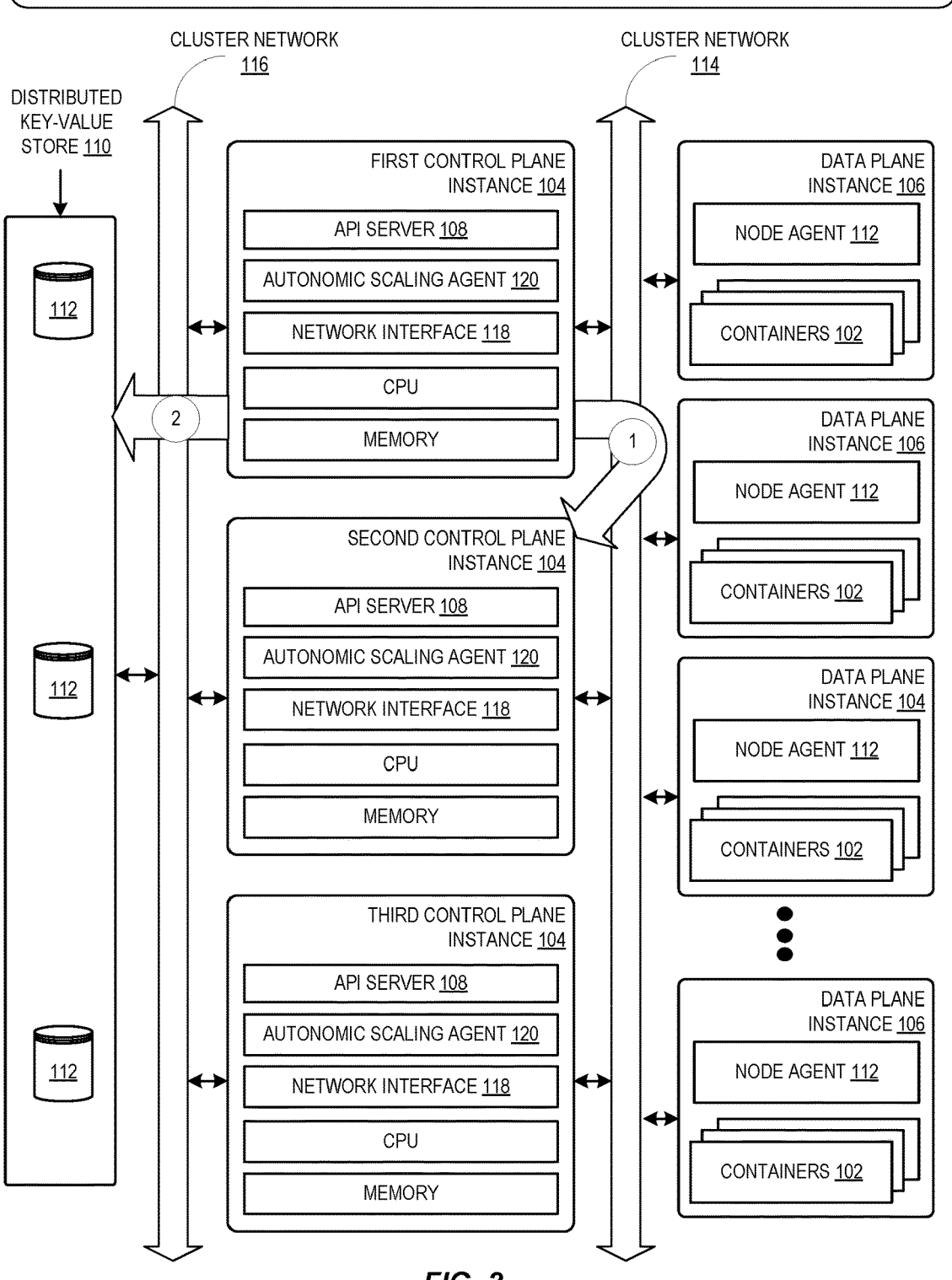
FIG. 2 illustrates a scenario with respect to the example system and method of FIG. 1 involving expanding the control plane by adding a new instance and then, using a distributed key-value store, determining its readiness to take over traffic from an existing instance that is under high load.

FIG. 2 illustrates a scenario with respect to the example system and method of FIG. 1 involving expanding the control plane by adding the second control plane instance 104 as a new instance and then, using the distributed key-value store 110, determining the second control plane instance 104's readiness to take over traffic from the first control plane instance 104 that is under high load. In particular, at operation 1, the first control plane instance 104 causes the second plane instance 104 to be added to the control plane. Then, at operation 2, the first control plane instance 104 determines that the second control plane instance 104 is in a cold compute resource utilization state based on determining from the distributed key-value store 110 that the second control plane instance 104 has been added to the control plane and is ready to receive and process control plane request traffic.

In some embodiments, this determination includes checking for the absence in the distributed key-value store 110 on a lock on the second control plane instance 104 or checking in the distributed key-value store 110 that the second control plane instance 104 is unlocked. These checks can be performed by the first control plane instance 104 querying (reading the values of) one or more keys in the distributed key-value store 110 or by the first control plane instance 104 setting a watch on one or more keys in the distributed key-value store 110 and by which the first control plane instance 104 is notified when the one or more keys or values thereof are added, modified, or deleted in the distributed key-value store 110 by the second control plane instance 104.

Figure 3:
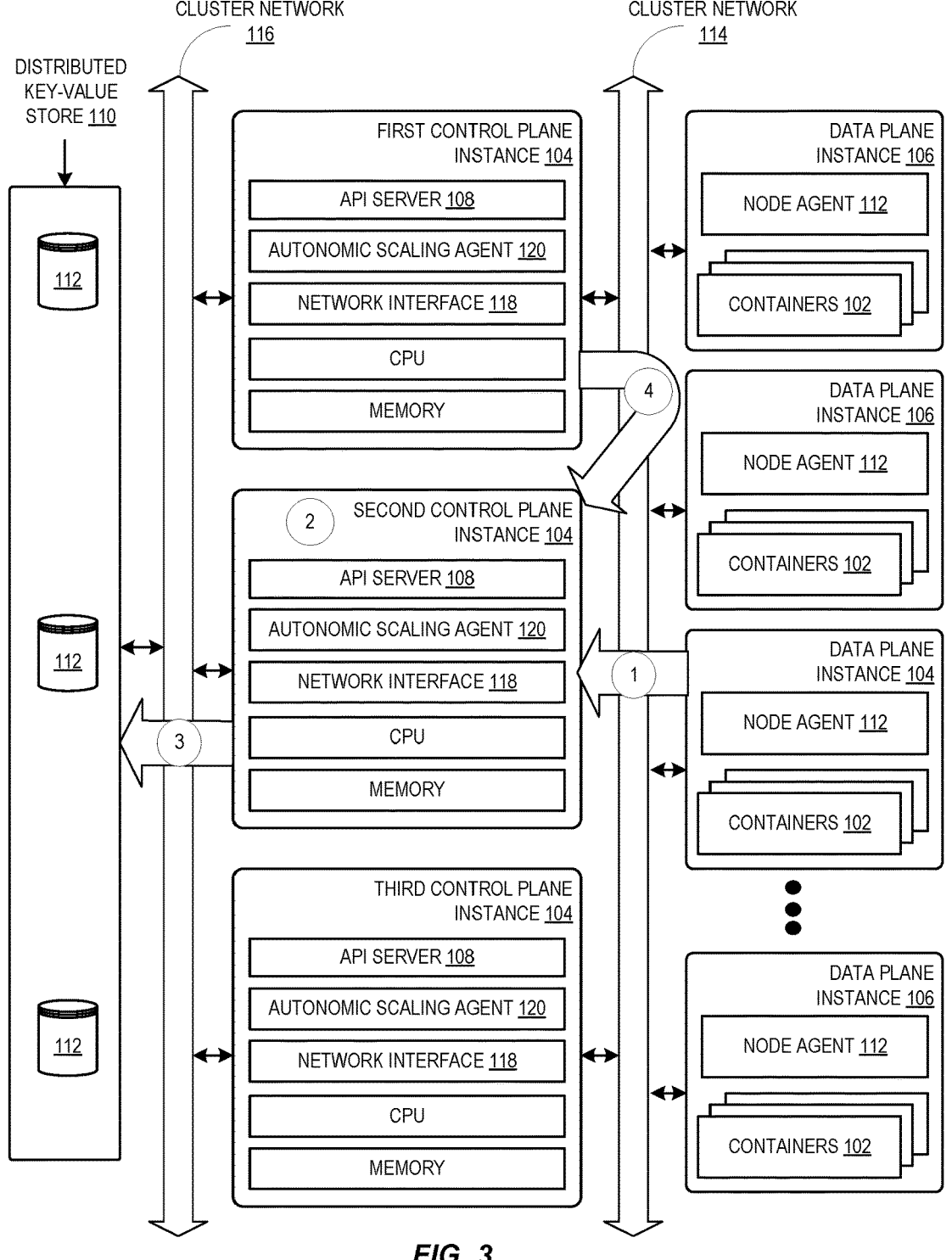
FIG. 3 illustrates a scenario with respect to the example system and method of FIG. 1 wherein the second control plane instance handling request traffic in a cold state, monitoring resource use, and continuing to process traffic even when hot, if all instances in the cluster are also in a hot state.

FIG. 3 illustrates a scenario with respect to the example system and method of FIG. 1 wherein the second control plane instance 104 handling request traffic in a cold state, monitoring resource use, and continuing to process redirected traffic even when hot, if all control plane instances 104 in the cluster 100 are also in a hot state. In particular, at operation 1, the second control plane instance 104 is in a cold state. In the cold state, the second control plane instance 104 receives and processes control plane request traffic including control plane request traffic redirected to it from the first control plane instance 104. While in this cold state, the second control plane instance 104 monitors utilization of one or more compute resources of the second control plane instance 104. At operation 2, the second control plane instance 104 detects that the second control plane instance is in a hot compute resource utilization state. At operation 3, the second control plane instance 104 determines from the distributed key-value store 110 that all other control plane instances (i.e., the first control plane instance 104 and the third control plane instance 104) are also in a hot state. At operation 4, while the second control plane instance 104 is in the hot state, the second control plane instance 104 continues to receive and process control plane request traffic redirected to it by the first control plane instance 104 instead of redirecting that traffic to another control plane instance.

FIG. 4 illustrates a scenario with respect to the example system and method of FIG. 1 involving managing traffic in the container orchestration cluster 110 by redirecting traffic from an overloaded second control plane instance 104 to a now underutilized first instance 104 based on their monitored states in the distributed key-value store 110. In particular, at operation 1, the second control plane instance 104 is in a cold state. While in the cold state, the second control plane instance 104 receives and processes control plane request traffic and monitors utilization of one or more compute resources of the second control plane instance 104. At operation 2, the second control plane instance 104 detects that it is now in a hot state. At operation 3, the second control plane instance 104 determines from the distributed key-value store 110 that the first control plane instance is in a cold state and no longer in a hot state. At operation 4, while the second control plane instance 104 is in the hot state, the second control plane instance 104 redirects network traffic carry control plane request traffic from itself to the first control plane instance 104.

Figure 5:
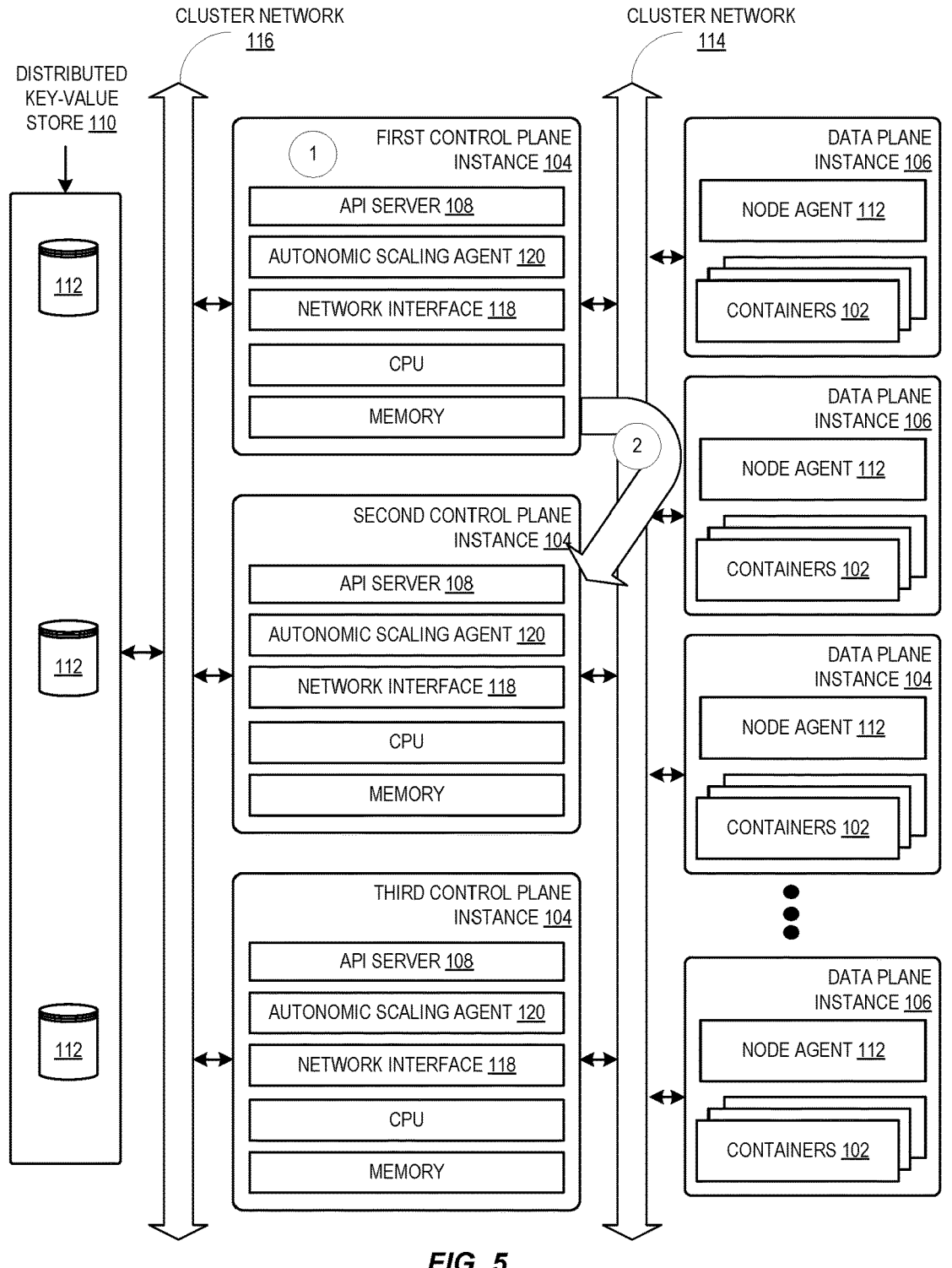
FIG. 5 illustrates a scenario with respect to the example system and method of FIG. 1 wherein the first control plane instance detecting a higher load state and consequently diverting a greater volume of network traffic to the second control plane instance to manage the load.

FIG. 5 illustrates a scenario with respect to the example system and method of FIG. 1 wherein the first control plane instance 104 detecting a higher load state and consequently diverting a greater volume of network traffic to the second control plane instance 104 to manage the load. In particular, at operation 1, the first control plane instance 104 detects that the first control plane instance 104 is in a hotter compute resource utilization state with respect to its current hot compute resource utilization state. At operation 2, the first control plane instance 104 redirects an increased amount of network traffic from the first control plane instance 104 to the second control plane instance 104. For example, the first control plane instance 104 may increase the percentage of TCP packets or TCP connections that are redirected from the first control plane instance 104 to the second control plane instance 104 from 50% to 60%.

Figure 6:
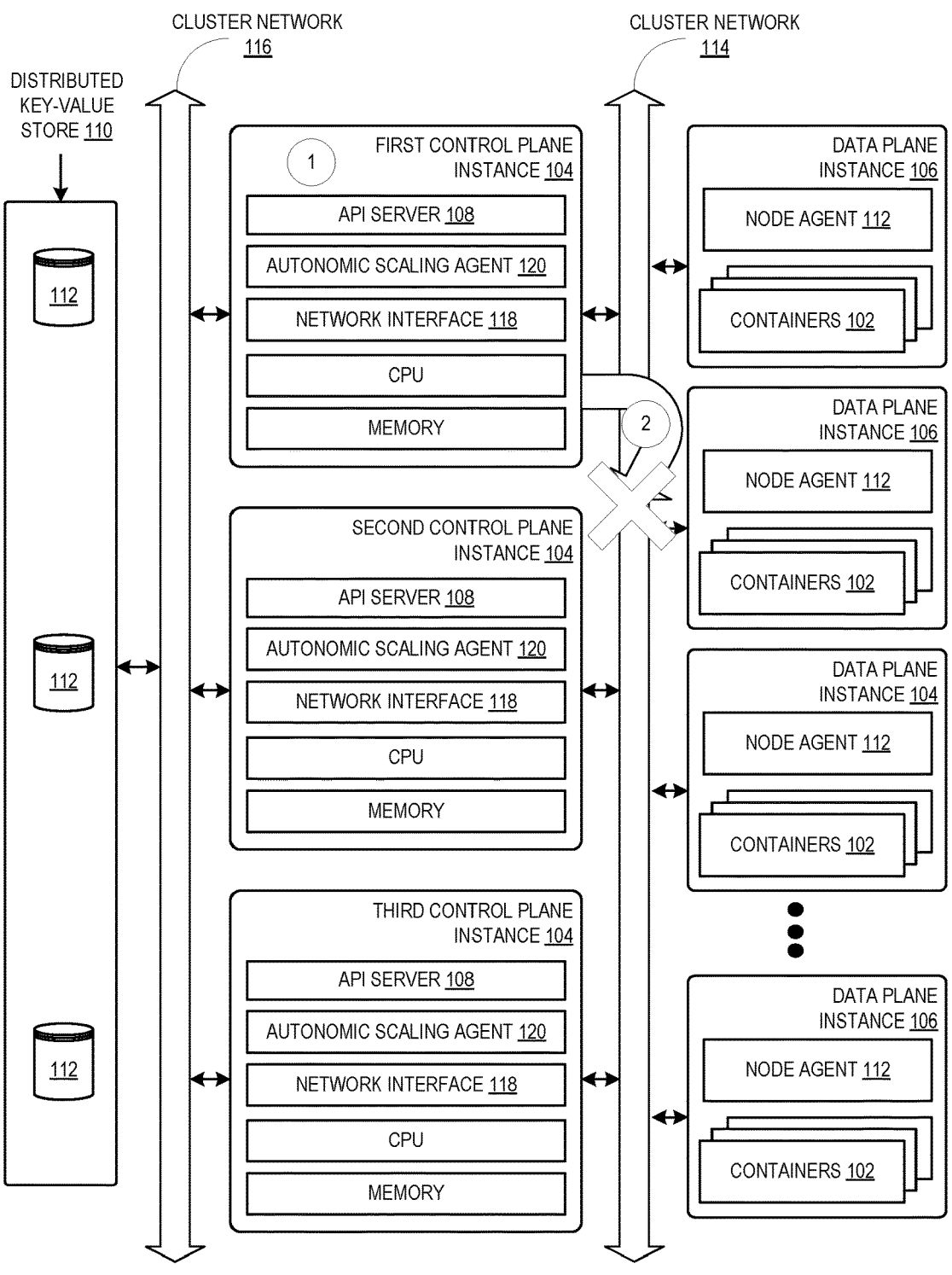
FIG. 6 illustrates a scenario with respect to the example system and method of FIG. 1 wherein the first control plane instance stopping the redirection of network traffic to the second instance when it detects that it is in a cold compute resource utilization state.

FIG. 6 illustrates a scenario with respect to the example system and method of FIG. 1 wherein the first control plane instance 104 stopping the redirection of network traffic to the second instance 104 when it detects that it is in a cold compute resource utilization state. In particular, at operation 1, the first control plane instance 104 detects that the first control plane instance 104 is transitioned from a hot state back to a cold state. Consequently, at operation 2, the first control plane instance 104 ceases redirecting network traffic to the second control plane instance 104.

FIG. 7 illustrates a scenario with respect to the example system and method of FIG. 1 involving managing load across the container orchestration cluster 100 by marking an overloaded first control plane instance 104 as locked in the key-value store 110, scaling out by adding a third instance 104, and rerouting traffic from a subsequently overloaded second instance 104 to this new, ready-to-receive third instance 104. In particular, at operation 1, the first control plane instance 104 detects that the first control plane instance 104 is in a hot compute resource utilization state. In response, the first control plane instance 104 marks itself as locked in the distributed key-value store 110, at operation 2. At operation 3, the second control plane instance 104 is in a cold state. While in the cold state, the second control plane instance 104 receives and process control plane request traffic and monitors utilization of one or more compute resources of the second control plane instance 104. Some time later, at operation 4, the second control plane instance 104 detects that it is in a hot state. At operation 5, the second control plane instance 104 determines from the distributed key-value store 110 that the first control plane instance 104 is also in a hot state. In response, at operation 6, the second control plane instance 104 causes a third control plane instance 104 to be added to the control plane. At operation 7, the second control plane instance 104 determines from the distributed key-value store 110 that the third control plane instance 104 has been added to the control plane and is ready to receive and process control plane request traffic. At operation 8, the second control plane instance 104 redirects network traffic (e.g., TCP packets) carrying control plane request traffic from the second control plane instance 104 to the third control plane instance 104.

In a variation of the scenario of FIG. 1, if the first control plane instance 104 is redirecting network traffic to the second control plane instance 104 when the second control plane instance 104 becomes hot at operation 4, then the first control plane instance 104 can cease redirecting network traffic to the second control plane instance 104 and start redirecting networking traffic to the third control plane instance 104. For example, the first control plane instance 104 may set a watch on one or more keys in the distributed key-value store 110 pertaining to the lock state of the second control plane instance 104. When the second control plane instance 104 detects that it has become hot at operation 4 it can lock itself in the distributed key-value store 110 by manipulating the one or more keys watched by the first control plane instance 104. This manipulation will cause the first control plane instance 104 to be notified that the second control plane instance 104 is now in a hot state and is now locked. The first control plane instance 104 can stop redirecting network traffic to the second control plane instance 104 and begin redirecting network traffic to the third control plane instance 104 that was just added to the control plane. To detect that the third control plane instance 104 has been added to the control plane and is ready to receive and process control plane request traffic, the first control plane instance 104 can set a watch on one or more keys in the distributed key-value store 110 that are manipulated upon the third control plane instance 104 being added to the control plane. For example, these one or more keys may be manipulated by the third control plane instance 104 when the third control plane instance 104 joins the control plane. This way, the first control plane instance 104 can detect that the third control plane instance 104 has been added to the control plane and can accept redirected network traffic that the second control plane instance 104 can no longer accept now that it is in the hot state and locked.

Figure 8:
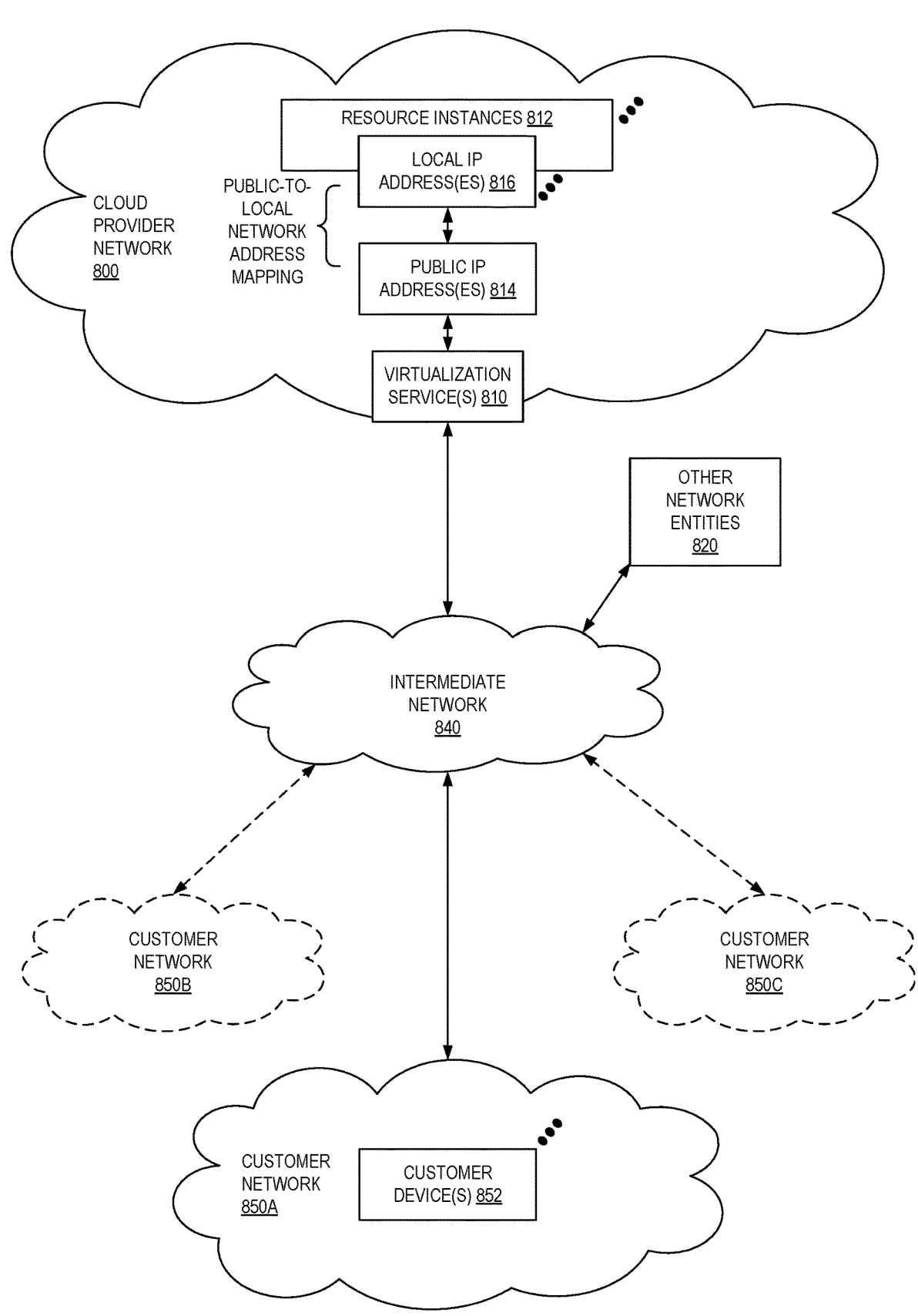
FIG. 8 illustrates an example cloud provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks")) including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
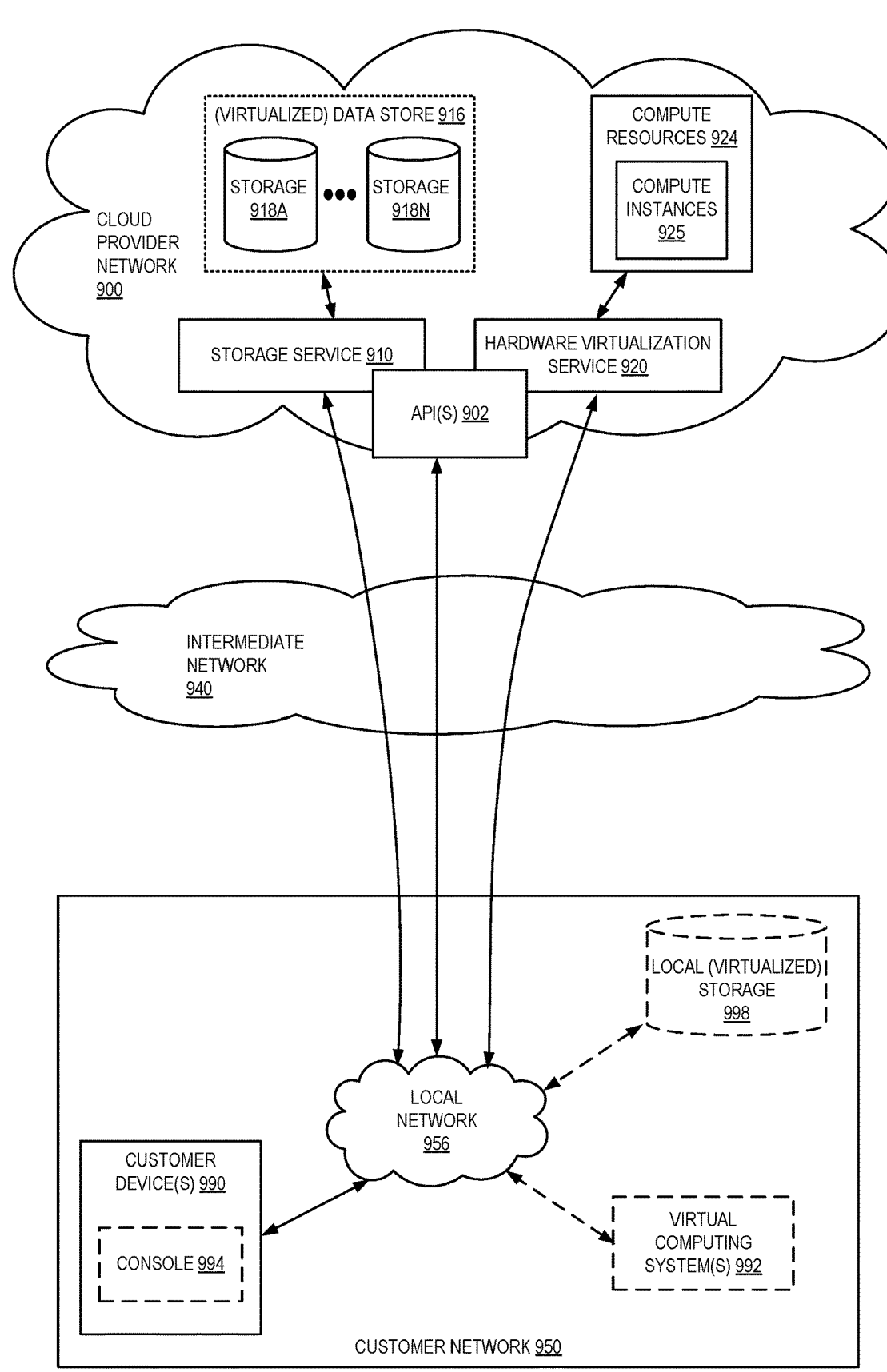
FIG. 9 is a block diagram of an example cloud provider network that provides a storage service and a hardware virtualization service to customers according to some examples.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Figure 10:
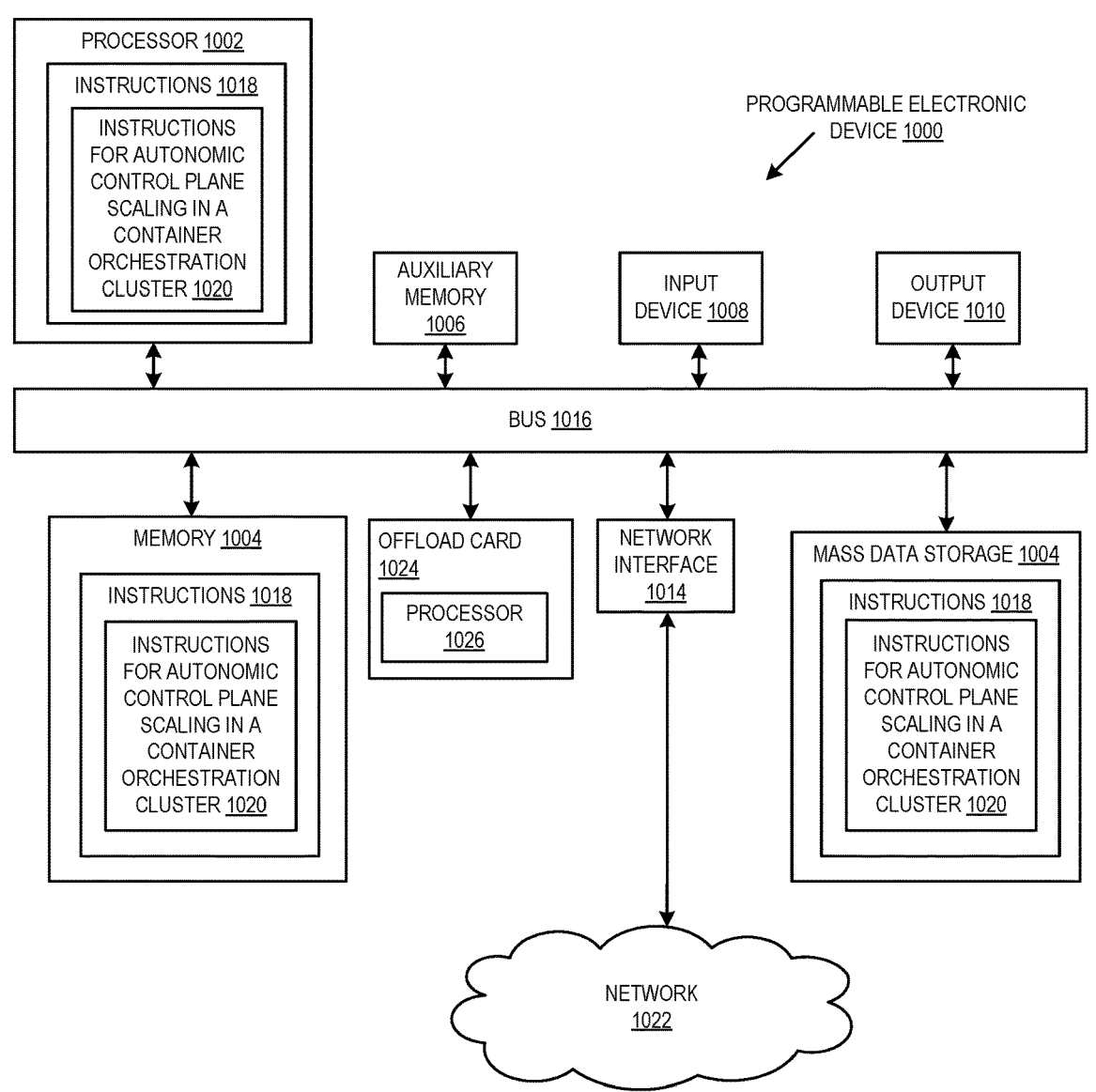
FIG. 10 illustrates an example of a programmable electronic device that processes and manipulates data to perform tasks and calculations disclosed herein for autonomic control plane scaling in a container orchestration cluster.

FIG. 10 illustrates an example of a programmable electronic device that processes and manipulates data to perform tasks and calculations disclosed herein for autonomic control plane scaling in a container orchestration cluster. Example programmable electronic device 1000 includes electronic components encompassing hardware or hardware and software including processor 1002, memory 1004, auxiliary memory 1006, input device 1008, output device 1010, mass data storage 1012, network interface 1014, and offload card 1024, all connected to bus 1016.

While only one of each type of component is depicted in FIG. 10 for the purpose of providing a clear example, multiple instances of any or all these electronic components may be present in device 1000. For example, multiple processors may be connected to bus 1016 in a particular implementation of device 1000. Accordingly, unless the context clearly indicates otherwise, reference with respect to FIG. 10 to a component of device 1000 in the singular such as, for example, processor 1002, is not intended to exclude the plural where, in a particular instance of device 1000, multiple instances of the electronic component are present. Further, some electronic components may not be present in a particular instance of device 1000. For example, device 1000 in a headless configuration such as, for example, when operating as a server racked in a data center, may not include, or be connected to, input device 1008 or output device 1010. As another example, offload card 1024 may be absent from device 1000 when not operating as a server racked in a data center as part of a cloud-based hosted compute service.

Processor 1002 is an electronic component that processes (e.g., executes, interprets, or otherwise processes) instructions 1018 including instructions 1020 for autonomic control plane scaling in a container orchestration cluster. Processor 1002 may perform arithmetic and logic operations dictated by instructions 1018 and coordinate the activities of other electronic components of device 1000 in accordance with instructions 1018. Processor 1002 may fetch, decode, and execute instructions 1018 from memory 1004. Processor 1002 may include a cache used to store frequently accessed instructions 1018 to speed up processing. Processor 1002 may have multiple layers of cache (L1, L2, L3) with varying speeds and sizes. Processor 1002 may be composed of multiple cores where each such core is a processor within processor 1002. The cores may allow processor 1002 to process multiple instructions 1018 at once in a parallel processing manner. Processor 1002 may support multi-threading where each core of processor 1002 can handle multiple threads (multiple sequences of instructions) at once to further enhance parallel processing capabilities. Processor 1002 may be made using silicon wafers according to a manufacturing process (e.g., 7 nm, 5 nm, or 3 nm). Processor 1002 can be configured to understand and execute a set of commands referred to as an instruction set architecture (ISA) (e.g., x86, x86_64, or ARM).

Depending on the intended application, processor 1002 can be any of the following types of central processing units (CPUs): a desktop processor for general computing, gaming, content creation, etc.; a server processor for data centers, enterprise-level applications, cloud services, etc.; a mobile processor for portable computing devices like laptops and tablets for enhanced battery life and thermal management; a workstation processor for intense computational tasks like 3D rendering and simulations; or any other suitable type of CPU.

While processor 1002 can be a CPU, processor 1002, depending on the intended application, can be any of the following types of processors: a graphics processing unit (GPU) capable of highly parallel computation allowing for processing of multiple calculations simultaneously and useful for rendering images and videos and for accelerating machine learning computation tasks; a digital signal processor (DSP) designed to process analog signals like audio and video signals into digital form and vice versa, commonly used in audio processing, telecommunications, and digital imaging; a tensor processing unit (TPU) or other specialized hardware for machine learning workloads, especially those involving tensors (multi-dimensional arrays); a field-programmable gate array (FPGA) or other reconfigurable integrated circuit that can be customized post-manufacturing for specific applications, such as cryptography, data analytics, and network processing; a neural processing unit (NPU) or other dedicated hardware designed to accelerate neural network and machine learning computations, commonly found in mobile devices and edge computing applications; an image signal processor (ISP) specialized in processing images and videos captured by cameras, adjusting parameters like exposure, white balance, and focus for enhanced image quality; an accelerated processing unit (APU) combing a CPU and a GPU on a single chip to enhance performance and efficiency, especially in consumer electronics like laptops and consoles; a vision processing unit (VPU) dedicated to accelerating machine vision tasks such as image recognition and video processing, typically used in drones, cameras, and autonomous vehicles; a microcontroller unit (MCU) or other integrated processor designed to control electronic devices, containing CPU, memory, and input/output peripherals; an embedded processor for integration into other electronic devices such as washing machines, cars, industrial machines, etc.; a system on a chip (SoC) such as those commonly used in smartphones encompassing a CPU integrated with other components like a graphics processing unit (GPU) and memory on a single chip; or any other suitable type of processor.

Memory 1004 is an electronic component that stores data and instructions 1018 that processor 1002 processes. Memory 1004 provides the space for the operating system, applications, and data in current use to be quickly reached by processor 1002. For example, memory 1004 may be a random-access memory (RAM) that allows data items to be read or written in substantially the same amount of time irrespective of the physical location of the data items inside memory 1004.

In some instances, memory 1004 is a volatile or non-volatile memory. Data stored in a volatile memory is lost when the power is turned off. Data in non-volatile memory remains intact even when the system is turned off. For example, memory 1004 can be Dynamic RAM (DRAM). DRAM such as Single Data Rate RAM (SDRAM) or Double Data Rate RAM (DDRAM) is volatile memory that stores each bit of data in a separate capacitor within an integrated circuit. The capacitors of DRAM leak charge and need to be periodically refreshed to avoid information loss. Memory 1004 can be Static RAM (SRAM). SRAM is volatile memory that is typically faster but more expensive than DRAM. SRAM uses multiple transistors for each memory cell but does not need to be periodically refreshed. Additionally, or alternatively, SRAM may be used for cache memory in processor 1002.

Device 1000 has auxiliary memory 1006 other than memory 1004. Examples of auxiliary memory 1006 include cache memory, register memory, read-only memory (ROM), secondary storage, virtual memory, memory controller, and graphics memory. Device 1000 may have multiple auxiliary memories including different types of auxiliary memories. Cache memory is found inside or very close to processor 1002 and is typically faster but smaller than memory 1004. Cache memory may be used to hold frequently accessed instructions 1018 (encompassing any associated data) to speed up processing. Cache memory may be hierarchical ranging from Level 1 cache memory which is the smallest but fastest cache memory and is typically inside processor 1002 to Level 2 and Level 3 cache memory which are progressively larger and slower cache memories that can be inside or outside processor 1002. Register memory is a small but very fast storage location within processor 1002 designed to hold data temporarily for ongoing operations. ROM is a non-volatile memory device that can only be read, not written to. For example, ROM can be a Programmable ROM (PROM), Erasable PROM (EPROM), or electrically erasable PROM (EEPROM). ROM may store basic input/output system (BIOS) instructions which help device 1000 boot up. Secondary storage is a non-volatile memory. For example, a secondary storage can be a hard disk drive (HDD) or other magnetic disk drive device; a solid-state drive (SSD) or other NAND-based flash memory device; an optical drive like a CD-ROM drive, a DVD drive, or a Blu-ray drive; or flash memory device such as a USB drive, an SD card, or other flash storage device. Virtual memory is a portion of a hard drive or an SSD that the operating system uses as if it were memory 1004. When memory 1004 gets filled, less frequently accessed data and instructions 1018 can be "swapped" out to the virtual memory. The virtual memory is slower than memory 1004, but it provides the illusion of having a larger memory 1004. A memory controller manages the flow of data and instructions 1018 to and from memory 1004. The memory controller can be located either on the motherboard of device 1000 or within processor 1002. Graphics memory is used by a graphics processing unit (GPU) and is specially designed to handle the rendering of images, videos, graphics, or performing machine learning calculations. Examples of graphics memory include graphics double data rate (GDDR) such as GDDR5 and GDDR6.

Input device 1008 is an electronic component that allows users to feed data and control signals into device 1000. Input device 1008 translates a user's action or the data from the external world into a form that device 1000 can process. Examples of input device 1008 include a keyboard, a pointing device (e.g., a mouse), a touchpad, a touchscreen, a microphone, a scanner, a webcam, a joystick/game controller, a graphics tablet, a digital camera, a barcode reader, a biometric device, a sensor, and a MIDI instrument.

Output device 1010 is an electronic component that conveys information from device 1000 to the user or to another device. The information can be in the form of text, graphics, audio, video, or other media representation. Examples of an output device 1010 include a monitor or display device, a printer device, a speaker device, a headphone device, a projector device, a plotter device, a braille display device, a haptic device, a LED or LCD panel device, a sound card, and a graphics or video card.

Mass data storage 1012 is an electronic component used to store data and instructions 1018. Mass data storage 1012 may be non-volatile memory. Examples of mass data storage 1012 include a hard disk drive (HDD), a solid-state drive (SDD), an optical drive, a flash memory device, a magnetic tape drive, a floppy disk, an external drive, or a RAID array device. Mass data storage 1012 could additionally or alternatively be connected to device 1000 via network 1022. For example, mass data storage 1012 could encompass a network attached storage (NAS) device, a storage area network (SAN) device, a cloud storage device, or a centralized network filesystem device.

Network interface 1014 (sometimes referred to as a network interface card, NIC, network adapter, or network interface controller) is an electronic component that connects device 1000 to network 1022. Network interface 1014 functions to facilitate communication between device 1000 and network 1022. Examples of a network interface 1014 include an ethernet adaptor, a wireless network adaptor, a fiber optic adapter, a token ring adaptor, a USB network adaptor, a Bluetooth adaptor, a modem, a cellular modem or adapter, a powerline adaptor, a coaxial network adaptor, an infrared (IR) adapter, an ISDN adaptor, a VPN adaptor, and a TAP/TUN adaptor.

Bus 1016 is an electronic component that transfers data between other electronic components of or connected to device 1000. Bus 1016 serves as a shared highway of communication for data and instructions (e.g., instructions 1018), providing a pathway for the exchange of information between components within device 1000 or between device 1000 and another device. Bus 1016 connects the different parts of device 1000 to each other. For example, bus 1016 may encompass one or more of: a system bus, a front-side bus, a data bus, an address bus, a control bus, an expansion bus, a universal serial bus (USB), a I/O bus, a memory bus, an internal bus, an external bus, and a network bus.

Instructions 1018 are computer-processable instructions that can take different forms. Instructions 1018 can be in a low-level form such as binary instructions, assembly language, or machine code according to an instruction set (e.g., x86, ARM, MIPS) that processor 1002 is designed to process. Instructions 1018 can include individual operations that processor 1002 is designed to perform such as arithmetic operations (e.g., add, subtract, multiply, divide, etc.); logical operations (e.g., AND, OR, NOT, XOR, etc.); data transfer operations including moving data from one location to another such as from memory 1004 into a register of processor 1002 or from a register to memory 1004; control instructions such as jumps, branches, calls, and returns; comparison operations; and specialization operations such as handling interrupts, floating-point arithmetic, and vector and matrix operations. Instructions 1018 can be in a higher-level form such as programming language instructions in a high-level programming language such as Python, Java, C++, etc. Instructions 1018 can be in an intermediate level form in between a higher-level form and a low-level form such as bytecode or an abstract syntax tree (AST).

Instructions 1018 for processing by processor 1002 can be in different forms at the same or different times. For example, when stored in mass data storage 1012 or memory 1004, instructions 1018 may be stored in a higher-level form such as Python, Java, or other high-level programing language instructions, in an intermediate-level form such as Python or Java bytecode that is compiled from the programming language instructions, or in a low-level form such as binary code or machine code. When stored in processor 1002, instructions 1018 may be stored in a low-level form such as binary instructions, assembly language, or machine code according to an instruction set architecture (ISA). However, instructions 1018 may be stored in processor 1002 in an intermediate level form or even a high-level form where CPU 1002 can process instructions in such form.

Instructions 1018 may be processed by one or more processors of device 1000 using different processing models including any or all of the following processing models depending on the intended application: sequential execution where instructions are processed one after another in a sequential manner; pipelining where pipelines are used to process multiple instruction phases concurrently; multiprocessing where different processors different instructions concurrently, sharing the workload; thread-level parallelism where multiple threads run in parallel across different processors; simultaneous multithreading or hyperthreading where a single processor processes multiple threads simultaneously, making it appear as multiple logical processors; multiple instruction issue where multiple instruction pipelines allow for the processing of several instructions during a single clock cycle; parallel data operations where a single instruction is used to perform operations on multiple data elements concurrently; clustered or distributed computing where multiple processors in a network (e.g., in the cloud) collaboratively process the instructions, distributing the workload across the network; graphics processing unit (GPU) acceleration where GPUs with their many processors allow the processing of numerous threads in parallel, suitable for tasks like graphics rendering and machine learning; asynchronous execution where processing of instructions is driven by events or interrupts, allowing the one or more processors to handle tasks asynchronously; concurrent instruction phases where multiple instruction phases (e.g., fetch, decode, execute) of different instructions are handled concurrently; parallel task processing where different processors handle different tasks or different parts of data, allowing for concurrent processing and execution; or any other suitable processing model.

Network 1022 is a collection of interconnected computers, servers, and other programmable electronic devices that allow for the sharing of resources and information. Network 1022 can range in size from just two connected devices to a global network (e.g., the internet) with many interconnected devices. Individual devices on network 1022 are sometimes referred to as "network nodes." Network nodes communicate with each other through mediums or channels sometimes referred to as "network communication links." The network communication links can be wired (e.g., twisted-pair cables, coaxial cables, or fiber-optic cables) or wireless (e.g., Wi-Fi, radio waves, or satellite links). Network 1022 may encompass network devices such as routers, switches, hubs, modems, and access points. Network nodes may follow a set of rules sometimes referred to "network protocols" that define how the network nodes communicate with each other. Example network protocols include data link layer protocols such as Ethernet and Wi-Fi, network layer protocols such as IP (Internet Protocol), transport layer protocols such as TCP (Transmission Control Protocol), application layer protocols such as HTTP (Hypertext transfer Protocol) and HTTPS (HTTP Secure), and routing protocols such as OSPF (Open Shortest Path First) and BGP (Border Gateway Protocol). Network 1022 may have a particular physical or logical layout or arrangement sometimes referred to as a "network topology." Example network topologies include bus, star, ring, and mesh. Network 1022 can be different of different sizes and scopes. For example, network 1022 can encompass some or all of the following categories of networks: a personal area network (PAN) that covers a small area (a few meters), like a connection between a computer and a peripheral device via Bluetooth; a local area network (LAN) that covers a limited area, such as a home, office, or campus; a metropolitan area network (MAN) that covers a larger geographical area, like a city or a large campus; a wide area network (WAN) that spans large distances, often covering regions, countries, or even globally (e.g., the internet); a virtual private network (VPN) that provides a secure, encrypted network that allows remote devices to connect to a LAN over a WAN; an enterprise private network (EPN) build for an enterprise, connecting multiple branches or locations of a company; or a storage area network (SAN) that provides specialized, high-speed block-level network access to storage using high-speed network links like Fibre Channel.

Device 1000 includes offload card 1024. Offload card 1024 includes its own processor 1026. Although not depicted in FIG. 1, offload card 1024 may also include network interface 1014. Offload card 1024 may be connected to bus 1016 via a Peripheral Component Interconnect-Express (PCI-E) standard or other suitable interconnect standard such as, for example, a QuickPath interconnect (QPI) standard or an UltraPath interconnect (UPI) standard. Device 1000 may include offload card 1024 when device 1000 acts as a host electronic device such as, for example, when operating as part of a hosted compute service. In this case, device 1000 hosts compute instances such as, for example, virtual machine instances or application container instances and offload card 1024 and processor 1026 run a hosted compute manager application that can manage the hosted compute instances that run on device 1000 and processor 1002. For example, the hosted compute manager application may perform hosted compute instance management operations, such as pausing or un-pausing hosted compute instances, launching or terminating hosted compute instances, performing memory transfer/copying operations, or other suitable hosted compute instance management operations. These management operations can, in some instances, be performed by the hosted compute manager application in coordination with a hypervisor (e.g., upon a request from the hypervisor) that runs on device 1000 and processor 1002. However, in some instances the hosted compute manager application is configured to process requests from other entities (e.g., from the hosted compute instances themselves), and does not coordinate with a hypervisor on device 1000.

Terminology

As used herein and in the appended claims, the term "computer-readable media" refers to one or more mediums or devices that can store or transmit information in a format that a computer system can access. Computer-readable media encompasses both storage media and transmission media. Storage media includes volatile and non-volatile memory devices such as RAM devices, ROM devices, secondary storage devices, register memory devices, memory controller devices, graphics memory devices, and the like.

As used herein and in the appended claims, the term "non-transitory computer-readable media" as used herein encompasses computer-readable media as just defined but excludes transitory, propagating signals. Data stored on non-transitory computer-readable media isn't just momentarily present and fleeting but has some degree of persistence. For example, instructions stored in a hard drive, a SSD, an optical disk, a flash drive, or other storage media are stored on non-transitory computer-readable media. Conversely, data carried by a transient electrical or electromagnetic signal or wave is not stored in non-transitory computer-readable media when so carried.

As used herein and in the appended claims, unless otherwise clear in context, the terms "comprising," "having," "containing," "including," "encompassing," "in response to," "based on," and the like are intended to be open-ended in that an element or elements following such a term is not meant to be an exhaustive listing of elements or meant to be limited to only the listed element or elements.

Unless otherwise clear in context, relational terms such as "first" and "second" are used herein and in the appended claims to differentiate one thing from another without limiting those things to a particular order or relationship. For example, unless otherwise clear in context, a "first device" could be termed a "second device." The first and second devices are both devices, but not the same device.

Unless otherwise clear in context, the indefinite articles "a" and "an" are used herein and in the appended claims to mean "one or more" or "at least one." For example, unless otherwise clear in context, "in an embodiment" means in at least one embodiment, but not necessarily more than one embodiment. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Unless otherwise explicitly stated, the terms "set", and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

As used herein, unless otherwise clear in context, the term "or" is open-ended and encompasses all possible combinations, except where infeasible. For example, if it is stated that a component may include A or B, then, unless infeasible or otherwise clear in context, the component may include at least A, or at least B, or at least A and B. As a second example, if it is stated that a component may include A, B, or C then, unless infeasible or otherwise clear in context, the component may include at least A, or at least B, or at least C, or at least A and B, or at least A and C, or at least B and C, or at least A and B and C.

Unless the context clearly indicates otherwise, conjunctive language in this description and in the appended claims such as the phrase "at least one of X, Y, and Z," is to be understood to convey that an item, term, etc. can be either X, Y, or Z, or a combination thereof. Thus, such conjunctive language does not require that at least one of X, at least one of Y, and at least one of Z to each be present.

Unless the context clearly indicates otherwise, the relational term "based on" is used in this description and in the appended claims in an open-ended fashion to describe a logical (e.g., a condition precedent) or causal connection or association between two stated things where one of the things is the basis for or informs the other without requiring or foreclosing additional unstated things that affect the logical or casual connection or association between the two stated things.

Unless the context clearly indicates otherwise, the relational term "in response to" is used in this description and in the appended claims in an open-ended fashion to describe a stated action or behavior that is done as a reaction or reply to a stated stimulus without requiring or foreclosing additional unstated stimuli that affect the relationship between the stated action or behavior and the stated stimulus.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
at a control plane instance in a control plane of a container orchestration cluster:
while the control plane instance is in a cold compute resource utilization state, receiving and processing control plane request traffic, and monitoring utilization of one or more compute resources of the control plane instance;
wherein the control plane comprises a plurality of control plane instances, the plurality of control instances comprising the control plane instance;
detecting that the control plane instance is in a hot compute resource utilization state;
determining from a distributed key-value store that each other control plane instance of the plurality of control plane instances is also in a hot compute resource utilization state;
causing a new control plane instance to be added to the control plane; and
after determining from the distributed key-value store that the new control plane instance has been added to the control plane and is ready to receive and process control plane request traffic, redirecting network traffic comprising control plane request traffic from the control plane instance to the new control plane instance.

2. The method of claim 1, further comprising:
at the new control plane instance:
while the new control plane instance is in a cold compute resource utilization state, receiving and processing control plane request traffic, and monitoring utilization of one or more compute resources of the new control plane instance;
detecting that the new control plane instance is in a hot compute resource utilization state;
determining from the distributed key-value store that each control plane instance of the plurality of control plane instances is also in a hot compute resource utilization state; and
while the new control plane instance is in a hot compute resource utilization state, processing control plane request traffic received from the control plane instance.

3. The method of claim 1, further comprising:
at the new control plane instance:
while the new control plane instance is in a cold compute resource utilization state, receiving and processing control plane request traffic, and monitoring utilization of one or more compute resources of the new control plane instance;
detecting that the new control plane instance is in a hot compute resource utilization state;

determining from the distributed key-value store that the control plane instance is in a cold compute resource utilization state; and
while the new control plane instance is in a hot compute resource utilization state, redirecting network traffic comprising control plane request traffic from the new control plane instance to the control plane instance.

4. A method comprising:
at a first control plane instance in a control plane of a container orchestration cluster: while the first control plane instance is in a cold compute resource utilization state, receiving and processing control plane request traffic, and monitoring utilization of one or more compute resources of the first control plane instance;
detecting that the first control plane instance is in a hot compute resource utilization state;
causing a second control plane instance to be added to the control plane:
determining, at the first control plane instance, that the second control plane instance in the control plane that is in a cold compute resource utilization state, based on data from a distributed key-value store indicating that the second control plane instance has been added to the control plane and is ready to receive and process control plane request traffic; and
while the first control plane instance is in a hot compute resource utilization state, redirecting network traffic comprising control plane request traffic from the first control plane instance to the second control plane instance.

5. The method of claim 4, wherein determining, at the first control plane instance, that the second control plane instance is in a cold compute resource utilization state is based on determining, at the first control plane instance, from the distributed key-value store that the second control plane instance is not in a lock state.

6. The method of claim 4, further comprising:
at the second control plane instance:
while the second control place instance is in a cold compute resource utilization state, receiving and processing control plane request traffic, and monitoring utilization of one or more compute resources of the second control plane instance;
detecting that the second control plane instance is in a hot compute resource utilization state;
locking the second control plane instance in the distributed key-value store;
determining from the distributed key-value store that each control plane instance of a plurality of control plane instances is also in a hot compute resource utilization state; and
while the second control plane instance is in a hot compute resource utilization state, processing control plane request traffic received from the first control plane instance.

7. The method of claim 4, further comprising:
at the second control plane instance:
while the second control plane instance is in a cold compute resource utilization state, receiving and processing control plane request traffic, and monitoring utilization of one or more compute resources of the second control plane instance;
detecting that the second control plane instance is in a hot compute resource utilization state;
determining from the distributed key-value store that the first control plane instance is in a cold compute resource utilization state; and
while the second control plane instance is in a hot compute resource utilization state, redirecting network traffic comprising control plane request traffic from the second control plane instance to the first control plane instance.

8. The method of claim 4, further comprising:

at the first control plane instance:

detecting that the first control plane instance is in a hotter compute resource utilization state; and while the first control plane instance is in a hotter compute resource utilization state, redirecting an increased amount of network traffic comprising control plane request traffic from the first control plane instance to the second control plane instance.

9. The method of claim 4, further comprising:

at the first control plane instance:

detecting that the first control plane instance in a cold compute resource utilization state; and while the first control plane instance is in a cold compute resource utilization state, ceasing redirecting of network traffic comprising control plane request traffic from the first control plane instance to the second control plane instance.

10. The method of claim 4, wherein the first control plane instance comprises a virtual machine instance; wherein monitoring, at the first control plane instance, utilization of one or more compute resources of the first control plane instance comprises monitoring, at the first control plane instance, a processor utilization of the virtual machine instance; and wherein detecting, at the first control plane instance, that the first control plane instance is in a hot compute resource utilization state is based on detecting, at the first control plane instance, that the processor utilization of the virtual machine instance exceeds a threshold.

11. The method of claim 4, wherein the first control plane instance comprises a virtual machine instance; wherein monitoring, at the first control plane instance, utilization of one or more compute resources of the first control plane instance comprises monitoring, at the first control plane instance, a memory utilization of the virtual machine instance; and wherein detecting, at the first control plane instance, that the first control plane instance is in a hot compute resource utilization state is based on detecting, at the first control plane instance, that the memory utilization of the virtual machine instance exceeds a threshold.

12. The method of claim 4, wherein redirecting network traffic comprising control plane request traffic from the first control plane instance to the second control plane instance comprises:

at the first control plane instance:

forwarding internet protocol (IP) packets to the second control plane instance.

13. The method of claim 4, wherein redirecting network traffic comprising control plane request traffic from the first control plane instance to the second control plane instance comprises:

at the first control plane instance:

forwarding internet protocol (IP) packets to the second control plane instance with network address translation (NAT).

14. The method of claim 4, wherein redirecting network traffic comprising control plane request traffic from the first control plane instance to the second control plane instance comprises:

at the first control plane instance:

proxying internet protocol (IP) packets received from one or more clients of the first control plane instance to the second control plane instance.

15. The method of claim 4, wherein monitoring, at the first control plane instance, utilization of one or more compute resources of the first control plane instance comprises monitoring, at the first control plane instance, a control plane request rate; and wherein detecting, at the first control plane instance, that the first control plane instance is in a hot compute resource utilization state is based on detecting, at the first control plane instance, that a control plane request rate exceeds a threshold.

16. The method of claim 4, further comprising:

in response to detecting, at the first control plane instance, that the first control plane instance is in a hot compute resource utilization state, setting the first control plane instance in a lock state in the distributed key-value store; and at a second control plane instance in the control plane:

while the second control plane instance is in a cold compute resource utilization state, receiving and processing control plane request traffic, and monitoring utilization of one or more compute resources of the second control plane instance;

wherein the control plane comprises a plurality of control plane instances, the plurality of control instances comprising the first control plane instance and the second control instance;

detecting that the second control plane instance is in a hot compute resource utilization state;

determining from the distributed key-value store that first control plane instance is also in a hot compute resource utilization state;

causing a third control plane instance to be added to the control plane; and after determining from the distributed key-value store that the third control plane instance has been added to the control plane and is ready to receive and process control plane request traffic, redirecting network traffic comprising control plane request traffic from the second control plane instance to the third control plane instance.

17. A system comprising:

one or more processors of a first control plane instance in a control plane of a container orchestration cluster; and a memory of the first control plane instance storing instructions to be processed by the one or more processors of the first control plane instance, the instructions for:

while the first control plane instance is in a cold compute resource utilization state, receiving and processing control plane request traffic, and monitoring utilization of one or more compute resources of the first control plane instance;

detecting that the first control plane instance is in a hot compute resource utilization state;

causing a second control plane instance to be added to the control plane:

determining that the second control plane instance in the control plane that is in a cold compute resource utilization state based on data from a distributed key-value store indicating that the second control plane instance has been added to the control plane and is ready to receive and process control plane request traffic; and while the first control plane instance is in a hot compute resource utilization state, redirecting network traffic comprising control plane request traffic to the second control plane instance.

18. The system of claim 17, further comprising:

one or more processors of a second control plane instance in the control plane; and a memory of the second control plane instance storing instructions to be processed by the one or more processors of the second control plane instance, the instructions for:

while the second control place instance is in a cold compute resource utilization state, receiving and processing control plane request traffic, and monitoring utilization of one or more compute resources of the second control plane instance;

detecting that the second control plane instance is in a hot compute resource utilization state;

determining from the distributed key-value store that each control plane instance of a plurality of control plane instances is also in a hot compute resource utilization state; and while the second control plane instance is in a hot compute resource utilization state, processing control plane request traffic received from the first control plane instance.

\* \* \* \* \*